(12) United States Patent
Kutsuwa et al.

(10) Patent No.: US 10,549,565 B2
(45) Date of Patent: Feb. 4, 2020

(54) INKJET RECORDING MEDIUM AND INKJET RECORDING METHOD

(71) Applicants: Nippon Paper Industries Co., Ltd., Tokyo (JP); Kao Corporation, Tokyo (JP)

(72) Inventors: Koji Kutsuwa, Tokyo (JP); Yasufumi Ueda, Wakayama (JP); Takayuki Suzuki, Wakayama (JP)

(73) Assignees: Nippon Paper Industries Co., Ltd., Tokyo (JP); Kao Corporation, Tokyo (JP)

( * ) Notice: Subject to any disclaimer, the term of this patent is extended or adjusted under 35 U.S.C. 154(b) by 0 days.

(21) Appl. No.: 16/076,471

(22) PCT Filed: Sep. 28, 2016

(86) PCT No.: PCT/JP2016/078577
§ 371 (c)(1),
(2) Date: Aug. 8, 2018

(87) PCT Pub. No.: WO2017/138186
PCT Pub. Date: Aug. 17, 2017

(65) Prior Publication Data
US 2019/0047308 A1 Feb. 14, 2019

(30) Foreign Application Priority Data
Feb. 10, 2016 (JP) .................. 2016-023818

(51) Int. Cl.
| | | |
|---|---|---|
| B41M 5/50 | (2006.01) | |
| C09D 11/322 | (2014.01) | |
| B41M 5/52 | (2006.01) | |
| B41J 2/01 | (2006.01) | |
| B41J 2/07 | (2006.01) | |
| B41J 2/16 | (2006.01) | |
| C09D 11/38 | (2014.01) | |

(52) U.S. Cl.
CPC ............. *B41M 5/502* (2013.01); *B41J 2/01* (2013.01); *B41J 2/07* (2013.01); *B41J 2/1642* (2013.01); *B41M 5/5218* (2013.01); *B41M 5/5227* (2013.01); *B41M 5/5236* (2013.01); *B41M 5/5245* (2013.01); *C09D 11/322* (2013.01); *C09D 11/38* (2013.01)

(58) Field of Classification Search
CPC ...... B41M 5/5218; B41M 5/5227; B41J 2/01; B41J 2/07
See application file for complete search history.

(56) References Cited

U.S. PATENT DOCUMENTS

| | | | |
|---|---|---|---|
| 5,030,325 A * | 7/1991 | Saji ................. | D21H 19/38 162/135 |
| 7,892,340 B2 | 2/2011 | Namba et al. | |
| 8,322,839 B2 | 12/2012 | Ohshima et al. | |
| 8,602,550 B2 | 12/2013 | Idei et al. | |
| 9,242,467 B2 | 1/2016 | Ozawa | |
| 10,179,470 B2 | 1/2019 | Kutsuwa et al. | |
| 2005/0004262 A1 | 1/2005 | Azuma et al. | |
| 2005/0176847 A1* | 8/2005 | Cagle ................. | C09D 11/30 523/160 |
| 2006/0017759 A1 | 1/2006 | Matsuzawa et al. | |
| 2007/0048508 A1* | 3/2007 | Kishida ............. | D21H 19/36 428/211.1 |
| 2008/0276833 A1* | 11/2008 | Sasaki .............. | C09D 11/30 106/31.13 |
| 2008/0282932 A1 | 11/2008 | Kiyomoto et al. | |
| 2009/0053409 A1 | 2/2009 | Yamamoto et al. | |
| 2009/0322805 A1 | 12/2009 | Chiwata | |
| 2010/0045760 A1 | 2/2010 | Kawakami et al. | |
| 2010/0209611 A1 | 8/2010 | Ohshima et al. | |
| 2010/0227067 A1 | 9/2010 | Namba et al. | |
| 2012/0107531 A1* | 5/2012 | Idei ................ | D21H 19/385 428/32.31 |
| 2014/0030451 A1 | 1/2014 | Romano | |
| 2015/0298479 A1 | 10/2015 | Watanabe et al. | |
| 2017/0259602 A1 | 9/2017 | Kutsuwa et al. | |

FOREIGN PATENT DOCUMENTS

| | | |
|---|---|---|
| JP | 2004-203903 A | 7/2004 |
| JP | 2007-185867 A | 7/2007 |
| JP | 2008-069332 A | 3/2008 |
| JP | 2008-095089 A | 4/2008 |
| JP | 2008-285605 A | 11/2008 |
| JP | 2009-126964 A | 6/2009 |
| JP | 2009-155425 A | 7/2009 |
| JP | 2009-220529 A | 10/2009 |
| JP | 2009-233925 A | 10/2009 |
| JP | 2010-126854 A | 6/2010 |
| JP | 2010-221688 A | 10/2010 |
| JP | 2011-148194 A | 8/2011 |
| JP | 2012-031043 A | 2/2012 |
| JP | 2013-059974 A | 4/2013 |
| JP | 2013-144730 A | 7/2013 |
| JP | 2013-188958 A | 9/2013 |

(Continued)

OTHER PUBLICATIONS

International Search Report corresponding to International Application No. PCT/JP2016/078577 dated Oct. 25, 2016.

(Continued)

*Primary Examiner* — Betelhem Shewareged
(74) *Attorney, Agent, or Firm* — Jenkins, Wilson, Taylor & Hunt, P.A.

(57) ABSTRACT

An inkjet recording medium having an ink receiving layer containing an inorganic pigment, starch, and copolymer latex on at least one surface of a base, characterized in that the inorganic pigment contains engineered calcium carbonate and kaolin, an amount of the engineered calcium carbonate is from 50% by weight or more to less than 80% by weight and an amount of the kaolin is from 10% by weight or more to less than 50% by weight with respect to a total amount of the inorganic pigment, and from 1 parts by weight or more to 10 parts by weight or less of an organic pigment having a glass transition temperature (Tg) of 20° C. or more is contained in the ink receiving layer with respect to 100 parts by weight of the inorganic pigment.

17 Claims, No Drawings

(56) References Cited

FOREIGN PATENT DOCUMENTS

| JP | 2014-118553 A | 6/2014 |
|---|---|---|
| JP | 2014-195996 A | 10/2014 |
| JP | 2015-013373 A | 1/2015 |
| JP | 2015-057316 A | 3/2015 |
| JP | 5926867 B1 | 5/2016 |
| JP | 6259960 B1 | 1/2018 |
| WO | WO 2009/082000 A1 | 7/2009 |
| WO | WO 2009/116678 A1 | 9/2009 |
| WO | WO 2011/001955 A1 | 1/2011 |
| WO | WO 2016/042875 A1 | 3/2016 |

OTHER PUBLICATIONS

Notification of Transmittal of translation of the IPRP and Written Opinion corresponding to International Application No. PCT/JP2016/078577 dated Aug. 14, 2018.
Extended European Search Report corresponding to European Application No. 15842573.6 dated Mar. 27, 2018.
International Search Report corresponding to international patent application No. PCT/JP2015/068193 dated Jul. 28, 2015.
Notification of Transmittal of Translation of the International Preliminary Report on Patentability and Written Opinion corresponding to International Patent Application No. PCT/JP2015/068193 dated Mar. 30, 2017.
Notice of Allowance corresponding to U.S. Appl. No. 15/510,389 dated Aug. 30, 2018.
J. Tappi, Paper pulp test method, No. 5-2, pp. 1-7 (2000).
JIS Z 8741, "Specular glossiness—Methods of measurement," Japanese Industrial Standard, pp. 1-19 (1997).
European Search Report corresponding to European Patent Application No. 16889887.2 dated Nov. 12, 2019.

* cited by examiner

INKJET RECORDING MEDIUM AND INKJET RECORDING METHOD

FIELD OF THE INVENTION

The present invention relates to an inkjet recording medium and an inkjet recording method.

DESCRIPTION OF THE RELATED ART

An inkjet recording method is a recording method that droplets of inkjet ink are directly discharged and deposited on a recording medium from a very fine nozzle to provide characters and images, This method is widely spread as it has a number of advantages that full colors are easily provided, it is inexpensive, plain paper can be used as a recoding medium, and it is not in contact with a matter to be printed. Recently, in order to add weatherbility and water resistance to a printed matter, pigment is widely used as a coloring agent of the inkjet ink.

Meanwhile, it requires a high-speed printing on a commercial printing recording medium using low absorption coated paper such as offset coat paper. When the low absorption recording medium is printed by the inkjet recording method, it is known that a liquid component is absorbed slowly, drying takes a time, and fixing properties just after printing is poor. Unlike plain paper and non-coated paper into which the pigment is penetrated, it is known that pigment particles remain on paper such as coated paper that is the low absorption recording medium, the fixing properties after drying is poor because an external force is directly applied thereto.

In order to solve the problems, there is proposed an inkjet recording method that both of inkjet ink and an inkjet recording medium are enhanced.

For example, Patent Literature 1 discloses a recording method using inkjet exclusive paper having high ink absorption properties and using pigment ink containing a large amount of a low volatile water-soluble organic solvent having excellent discharging properties.

Patent Literatures 2 to 5 each discloses a recording method using pigment ink containing a large amount of a low volatile water-soluble organic solvent having excellent discharging properties on a recording medium having a specific ink absorption layer (=coating layer) containing at least 30% by weight or more of an inorganic pigment except for hydrate alumina having a refractive index of 1.5 or more.

Patent Literature 6 shows a recording method that provides a high image quality on plain paper.

Patent Literature 7 shows a recording method that provides clear image quality without being affected by a recording medium by depositing a received solution of a primer on a printing surface of the recording medium, depositing inkjet ink on the deposited received solution, and printing.

PRIOR ART LITERATURE

Patent Literature

[Patent Literature 1] Japanese Unexamined Patent Publication 2004-203903
[Patent Literature 2] Japanese Unexamined Patent Publication 2008-069332
[Patent Literature 3] Japanese Unexamined Patent Publication 2008-095089
[Patent Literature 4] Japanese Unexamined Patent Publication 2009-126964
[Patent Literature 5] Japanese Unexamined Patent Publication 2009-220529
[Patent Literature 6] Japanese Unexamined Patent Publication 2007-185867
[Patent Literature 7] Japanese Unexamined Patent Publication 2013-188958

SUMMARY OF THE INVENTION

Problems to be Solved by the Invention

However, as a coating layer used for the inkjet exclusive paper described in Patent Literature 1 is greatly different from a coating layer used for offset coat paper, a texture of an offset coat printed matter is not acquired. In addition, the technologies described in Patent Literatures 2 to 5 are premised on using ink containing a certain amount or more of a low volatile water-soluble organic solvent, i.e., a water-soluble organic solvent having a high boiling point as pigment ink having excellent discharging properties. Thus, ink-drying properties are poor, and it is difficult to achieve a high speed printing.

In the technology described in Patent Literature 6, plain paper having no ink-receiving layer is used. Although the ink-drying properties are high, color properties and glossiness are low, and a texture of offset coat paper printing is not acquired. In addition, a water-soluble polymer dispersant used for a dispersant of pigment in ink interacts with water and the water-soluble organic solvent, and easily includes water and the water-soluble organic solvent. If it is applied for printing to a recording medium having an ink-receiving layer, the ink-drying properties are poor, and the fixing properties have a problem.

In the technology described in Patent Literature 7, a pretreatment (surface treatment) of applying and drying the primer on the recording medium is necessary before printing in advance, resulting in poor workability.

An object of the present invention is to provide an inkjet recording medium having excellent ink drying properties, a high definition image quality, high color development, an offset printing type texture, and high glossiness especially when the recording medium is printed using pigment ink. Also, an object of the present invention is to provide an inkjet recording method that provides high ink discharging properties, excellent ink drying properties with no pretreatment of the recording medium, high fixing properties, high color development, a high glossiness, and an offset printing type texture when the recording medium is printed using pigment ink.

Means for Solving the Problem

Through intensive studies by the present inventors, it is found that when an ink receiving layer contains engineered calcium carbonate, kaolin, and an organic pigment and a binder is starch and copolymer latex, ink drying properties are excellent upon inkjet printing, especially with a pigment ink, high definition image quality and high color development are provided, and texture like offset printing and high glossiness are attained to complete the present invention. Especially, in terms of increasing glossiness of the ink receiving layer, it had better to increase kaolin and the organic pigment and to decrease the engineered calcium carbonate. However, the increased kaolin and organic pigment may decrease the image quality and the ink drying properties. In view of the above, amounts of the respective components are defined.

Specifically, according to the present invention, an inkjet recording medium has an ink receiving layer containing an inorganic pigment, starch, and copolymer latex on at least one surface of a base, characterized in that the inorganic pigment contains engineered calcium carbonate and kaolin, an amount of the engineered calcium carbonate is from 50% by weight or more to less than 80% by weight and an amount of the kaolin is from 10% by weight or more to less than 50% by weight with respect to a total amount of the inorganic pigment, and from 1 parts by weight or more to 10 parts by weight or less of an organic pigment having a glass transition temperature (Tg) of 20° C. or more is contained in the ink receiving layer with respect to 100 parts by weight of the inorganic pigment.

Preferably, the engineered calcium carbonate has a volume 50% average particle diameter (D50) measured by a laser light scattering method of 0.2 μm or more to 2.0 μm or less.

Preferably, the engineered calcium carbonate has a ratio (D75/D25) of a cumulative 75% by weight particle diameter (D75 (μm)) and a cumulative 25% by weight particle diameter (D25 (μm)) measured by an X-ray transmission sedimentation particle size distribution measurement method of 3.0 or less.

Preferably, the kaoline has a volume 50% average particle diameter (D50) measured by a laser light scattering method of 0.1 μm or more to 1.5 μm or less.

Preferably, the amount of the kaolin is from 20% by weight or more to 40% by weight or less with respect to a total amount of the inorganic pigment.

Preferably, the copolymer latex contains an acrylonitrile styrene butadiene-based copolymer.

Preferably, white paper glossiness at a light incidence angle of 60 degrees according to JIS Z8741 of a surface of the ink receiving layer is from 25% or more to 50% or less.

Preferably, the inkjet recording medium has air permeability according to J. TAPPI No. 5-2: 2000 of from 5000 seconds or more to less than 11000 seconds.

In addition, it is found that the above-described problems can be solved by using an inkjet ink that is a specific aqueous pigment ink for the above-described inkjet recording medium as an inkjet recording method. Specifically, high ink discharging properties are provided, ink drying properties are excellent with no pretreatment of the recording medium, high fixing properties and high color development are provided, and texture like offset printing and high glossiness are attained.

Especially when the inkjet recording is performed by one-pass printing at a frequency of 20 kHz or more (corresponding to a printing speed of 50 m/minute or more), an ink drying load is increased. Accordingly, the inkjet recording method according to the present invention is more effectively applied.

Specifically, it is conceivable that, as the inkjet ink contains one or more of pigments selected from self dispersed pigment and pigment containing water insoluble polymer particles, thickening of the ink is inhibited, the ink can be stably present even if the water-soluble organic solvent is contained, ink discharging properties are improved, and absorbing the water-soluble organic solvent to the ink receiving layer is also not inhibited. Furthermore, it is conceivable that, as the inkjet ink contains the water-soluble organic solvent having a boiling point of 230° C. or less in a predetermined percentage, ink viscosity is low, and thickening of ink upon drying is inhibited, thereby solving a problem such as a nozzle clogging upon printing (especially, high-speed printing).

Also, the water-soluble organic solvent A highly interacts with calcium carbonate bound by starch and copolymer latex in the ink receiving layer, and is absorbed promptly into the ink receiving layer, thereby improving the ink drying properties. In addition, it is conceivable that, as the water-soluble organic solvent A is promptly absorbed into the ink receiving layer, thereby increasing a pigment concentration in the inkjet ink attached to a surface of the inkjet recording medium, and interacts with the pigment particles, thereby improving the fixing properties, a printing density, and glossiness. In terms of increasing glossiness of the ink receiving layer, it had better to increase kaolin and the organic pigment and to decrease the engineered calcium carbonate. However, the increased kaolin and organic pigment may decrease the image quality and the ink drying properties. In view of the above, amounts of the respective components are defined.

Specifically, according to the present invention, an inkjet recording method for printing an inkjet recording medium with inkjet ink as aqueous pigment ink, wherein the inkjet recording medium includes an ink receiving layer containing an inorganic pigment, starch, and a copolymer latex on at least one surface of a base, the inorganic pigment of the ink receiving layer contains engineered calcium carbonate and kaolin, an amount of the engineered calcium carbonate is from 50% by weight or more to less than 80% by weight, and an amount of the kaolin is from 10% by weight or more to less than 50% by weight with respect to the total amount of the inorganic pigment, the ink receiving layer further contains from 1 parts by weight or more to 10 parts by weight or less of an organic pigment having a glass transition temperature (Tg) of 20° C. or more with respect to 100 parts by weight of the inorganic pigment, the inkjet ink contains one or more pigments selected from self dispersed pigment and pigment containing water insoluble polymer particles, from 10% by weight or more to 46% by weight or less of a water soluble organic solvent A having a boiling point of 230° C. or less, from 0% by weight or more to 5.0% by weight or less of a water soluble organic solvent B having a boiling point of 280° C. or more, and from 44% by weight or more to 70% by weight or less of water.

Preferably, the printing is performed by one pass printing at a frequency of 20 kHz or more.

Preferably, a ratio Y/X satisfies the following formula:

$$12 \times 10^{-15} \leq Y/X \leq 11 \times 10^{-14}$$

where X is an amount (g/m$^2$) of the engineered calcium carbonate per unit area of the ink receiving layer and Y is an amount of the water soluble organic solvent A (g/m$^2$) per dot area when the inkjet recording medium is dot printed with the inkjet ink.

Preferably, the inkjet ink further contains from 0.6% by weight or more to 3.0% by weight or less of a nonionic surfactant.

Preferably, the pigment of the inkjet ink contains water insoluble polymer particles.

Preferably, the engineered calcium carbonate has a ratio (D75/D25) of a cumulative 75% by weight particle diameter (D75 (μm)) and a cumulative 25% by weight particle diameter (D25 (μm)) measured by an X-ray transmission sedimentation particle size distribution measurement method of 3.0 or less.

Preferably, the kaolin has a volume 50% average particle diameter (D50) measured by a laser light scattering method of 0.1 μm or more to 1.5 μm or less.

Preferably, the amount of the kaolin is from 20% by weight or more to 40% by weight or less with respect to a total amount of the inorganic pigment.

Preferably, the copolymer latex contains an acrylonitrile styrene butadiene-based copolymer.

Effects of Invention

According to the present invention, there is provided an inkjet recording medium having excellent ink drying properties upon inkjet printing, especially with a pigment ink, high definition image quality, high color development, texture like offset printing, and high glossiness. Also, inkjet recording can be performed that provides high ink discharging properties, excellent ink drying properties with no pretreatment of the recording medium, high fixing properties, high color development, a high glossiness, and an offset printing type texture when the recording medium is printed using pigment ink,

DESCRIPTION OF THE EMBODIMENTS

<Inkjet Recording Medium>

An inkjet recording medium of the present invention has an ink receiving layer containing an inorganic pigment, starch, and copolymer latex on at least one surface of a base, in which the inorganic pigment contains engineered calcium carbonate and kaolin, an amount of the engineered calcium carbonate is from 50% by weight or more to less than 80% by weight and an amount of the kaolin is from 10% by weight or more to less than 50% by weight with respect to a total amount of the inorganic pigment, and from 1 parts by weight or more to 10 parts by weight or less of an organic pigment having a glass transition temperature (Tg) of 20° C. or more is contained in the ink receiving layer with respect to 100 parts by weight of the inorganic pigment.

Note that, in a case where the ink receiving layers are formed on both surfaces of the base, the amounts of the inorganic pigment and the organic pigment are defined within the above-described range for each ink receiving layer.

(Inorganic Pigment)

Examples of the inorganic pigment contained in the ink receiving layer include known pigments such as calcium carbonate, silica, kaolin, calcined kaolin, clay, calcium silicate, calcium sulfate, aluminum oxide (alumina), aluminum hydroxide, aluminum silicate, titanium oxide, zinc oxide, magnesium carbonate, magnesium silicate, talc, and zeolite. Also, these may be used in combination according to the required quality.

(Engineered Calcium Carbonate)

In general, coarse particles of calcium carbonate are crushed to small particle diameter. Depending on the crushing method, fine particles are increased and the particle size distribution is broad. If calcium carbonate including many fine particles is used for the ink receiving layer, the fine particles are caught in the gaps of the ink receiving layer and the filling proceeds. Accordingly, the ink receiving layer is highly densified and ink drying properties may be decreased.

According to the present invention, the amount of the engineered calcium carbonate is from 50% by weight or more to less than 80% by weight with respect to a total amount of the inorganic pigment. Thus, a phenomenon (migration) that the binder in the coating color for the ink receiving layer is less penetrated into the base and the uneven coating of the ink receiving layer is decreased. Accordingly, the ink drying properties are excellent upon the inkjet printing with the pigment ink and the high definition image quality and high color development will be provided.

Furthermore, in a case where the amount of the engineered calcium carbonate is 50% by weight or more, an inkjet recording medium having a properties closer to those of a recording medium for offset printing mainly using a pigment such as kaolin and clay, i.e., having texture like offset printing and a high glossiness is easily provided as compared with the inkjet recording medium mainly using a bulky pigment with many gaps such as silica and aluminum oxide (alumina). In addition, in a case where the amount of the engineered calcium carbonate is 50% by weight or more, inorganic pigment slurry is easily highly concentrated, which in turn allows the coating color for the ink receiving layer to be easily highly concentrated. As a result, a load of drying the coating liquid is small and the inkjet recording medium can be produced at a high speed.

On the other hand, in a case where the amount of the engineered calcium carbonate is 80% by weight or more, the ink absorption properties are too excess to provide sufficient color development (printing density) or white paper glossiness is decreased, such that a texture of a glossy coating for offset printing is hard to be acquired. Accordingly, the amount of the engineered calcium carbonate is less than 80% by weight.

Preferably, the amount of the engineered calcium carbonate is from 65% by weight or more to less than 80% by weight with respect to a total amount of the inorganic pigment.

In the present invention, the engineered calcium carbonate may be engineered ground calcium carbonate provided by engineering ground calcium carbonate or engineered precipitated calcium carbonate provided by engineering precipitated calcium carbonate. The engineered ground calcium carbonate is preferable in that inorganic pigment slurry is easily highly concentrated, which in turn allows the coating color for the ink receiving layer to be easily highly concentrated. As a result, a load of drying the coating liquid is small and the inkjet recording medium can be produced at a high speed, A particle diameter of the engineered calcium carbonate used in the present invention is not especially limited. In general, the engineered calcium carbonate having a volume 50% average particle diameter (D50) measured using a laser light scattering method (laser diffraction method) of 0.2 μm or more to 2.0 μm or less is preferably used from the viewpoint of the ink drying properties and the color development, In particular, in a case where the D50 is 0.3 to 1.2 μm, the pigment slurry and the coating color for the ink receiving layer are further easily highly concentrated and the uneven coating of the ink receiving layer is further decreased. More preferably, the D50 is 0.5 to 1.0 μm, most preferably the D50 is 0.6 to 0.9 μm.

The particle size distribution is measured by the laser light scattering method (laser diffraction method) utilizing a light scattering phenomenon and can be determined by the Mie theory and the Fraunhofer approximation, As a method of calculating the particle size distribution from scattered light depends on a particle size measurement apparatus. In the present invention, the values measured by a laser particle size measuring apparatus (Mastersizer type S manufactured by Malvern Instruments Ltd., light source: red light 633 nm (He—Ne laser), blue light 466 nm (LED)) is used.

In addition, according to the method for measuring the particle size distribution, sample slurry containing calcium carbonate is dropped and mixed with pure water to form uniform dispersion. The dispersion is used as a sample.

In addition, the engineered calcium carbonate used in the present invention preferably has a particle diameter ratio (D75/025) of 3.0 or less, D75 being cumulative 75% by weight of a particle diameter (μm) from smaller particle diameter and D25 being cumulative 25% by weight of a particle diameter (μm) from smaller particle diameter measured by an X-ray transmission sedimentation particle size distribution measurement method (X-ray transmission gravitational sedimentation method). In a case where the D75/D25 is closer to 1.0, it represents that the particle size distribution is narrow, i.e., it has a sharp peak.

The particle size distribution measured by the X-ray transmission sedimentation particle size distribution measurement method uses a liquid phase sedimentation and the particle diameter is measured based on the Stokes' law, In addition, sedimentated suspension is irradiated with X rays and the particle size distribution is measured according to the Lambert-Beer's law from an X ray transmission amount.

In the present invention, the values measured by using an X-ray transmission sedimentation particle size distribution measurement apparatus (Sedigraph 5100 manufactured by Micromeritics Instrument Corp.) are used.

(Kaolin)

In the present invention, the amount of kaolin is from 10% by weight or more to less than 50% by weight with respect to the total amount of the inorganic pigment. With this configuration, while image quality and ink drying properties are ensured, glossiness of the ink receiving layer can be increased. If the amount of kaolin is less than 10% by weight, it is difficult to increase the glossiness of the ink receiving layer. If the amount of kaolin is 50% by weight or more, the glossiness of the ink receiving layer is increased but the ink drying properties are decreased. Preferably, the amount of kaolin is from 20% by weight or more to 40% by weight or less with respect to the total amount of the inorganic pigment.

The particle diameter of kaolin is not especially limited, From the viewpoint of the ink drying properties and the glossiness of the ink receiving layer, a volume 50% average particle diameter (D50) measured by a laser light scattering method (laser diffraction method) is preferably 0.1 μm or more to 1.5 μm or less. In particular, the D50 is preferably from 0.2 to 1.5 μm in that the ink drying properties are ensured and the glossiness of the ink receiving layer can be easily increased. Most preferably, the D50 is 0.3 to 0.8 μm.

(Organic Pigment)

In the present invention, the ink receiving layer contains from 1 parts by weight or more to 10 parts by weight or less of organic pigment having a glass transition temperature (Tg) of 20° C. or more with respect to the inorganic pigment 100 parts by weight. The organic pigment has an effect to increase the glossiness of the ink receiving layer. However, if the amount of the organic pigment exceeds 10% by weight with respect to the total amount of the inorganic pigment, the organic pigment are fitted into the gaps of the ink receiving layer and the gaps are filled therewith, which results in decreased ink drying properties and fixing properties.

If the Tg of the organic pigment is less than 20° C. and when the coating color for the ink receiving layer is coated and dried to form the ink receiving layer, the organic pigment is soften and melted and the gaps of the ink receiving layer are easily filled therewith, which results in poor ink drying properties and fixing properties. The upper limit of the Tg of the organic pigment is not especially limited but is about 140° C. in terms of manufacture.

Specific examples of the organic pigment include LX407BP9 (product name) (polystyrene-based organic pigment coated with styrene-butadiene copolymer latex, Tg: 60° C.), LX407BP6 (product name) (Tg: 75° C.), MH8101 (product name) (Tg: 105° C.) manufactured by Zeon Corporation.

Note that the ink receiving layer may contain various binders other than starch and copolymer latex as described later but the same compound as the organic pigment may not be used for the binder. In addition, in a case where the cross section of the ink receiving layer is observed by using a scanning electron microscope or the like, the organic pigment is dispersed as grains in a matrix of the ink receiving layer and can be distinguished from the binder in relation to the composition.

(Binder)

The ink receiving layer contains the binder, and the binder contained in the ink receiving layer involves starch and copolymer latex.

(Starch)

Starch used in the present invention may be known starch used in common coating paper, and is not especially limited. Examples include a variety of starch such as enzyme denaturation starch, thermochemically denaturation starch, oxidized starch, esterified starch, etherified starch such as hydroxyethylated starch, and cationized starch. The starch may be used alone or two or more in combination.

In the present invention, in order to provide good ink-drying properties and fixing properties upon the inkjet recording using the pigment ink, an amount of the starch is 0.5 parts by weight or more, preferably from 0.5 parts by weight or more to 5.0 parts by weight or less, more preferably from 1.0 parts by weight or more to 5.0 parts by weight or less, still preferably from 1.0 parts by weight or more to 3.0 parts by weight or less with respect to 100 parts by weight of the inorganic pigment.

If the amount of the starch is less than 0.5 parts by weight, water retention properties of the coating color for the ink-receiving layer becomes insufficient, and the phenomenon that the binder in the coating color is penetrated into the base (migration) is likely to occur. Accordingly, the coating unevenness of the ink-receiving layer is increased, and the ink fixing failure occurs where the ink-receiving layer is less coated upon the inkjet recording. If the amount of the starch exceeds 5.0 parts by weight, an enhancement effect of the water retention properties of the coating color for the ink-receiving layer tends to be saturated.

(Copolymer Latex)

Examples of the copolymer latex used in the present invention include conjugated diene copolymer latex such as acrylonitrile butadiene copolymer, styrene butadiene copolymer, methyl methacrylate butadiene copolymer; acrylic copolymer latex such as copolymer of acrylic ester and methacrylic ester; vinyl copolymer latex such as ethylene-acetic vinyl copolymer and vinyl chloride-acetic vinyl copolymer, or the like. Among them, from the standpoint of providing good ink-drying properties upon the inkjet recording using the pigment ink and sufficiently spreading ink, the conjugated diene copolymer latex is preferable, acrylonitrile butadiene copolymer and styrene butadiene copolymer are more preferable, and acrylonitrile butadiene copolymer is especially preferable.

The copolymer latex of the present invention may be provided by polymerizing (A) an aliphatic conjugated diene monomer and (B) other copolymerizable vinyl monomer.

Examples of the copolymer latex include an acrylonitrile styrene butadiene-based copolymer (NSBR) where the (A) component is 1,3-butadiene and the (B) component is an aromatic vinyl compound (for example, styrene), alkyl(meth)acrylate (for example, methyl methacrylate) or a vinyl cyanide compound (for example, acrylonitrile). The copolymer latex used in the present invention is produced by copolymerizing a monomer mixture by using a known polymerization method including a bulk polymerization method, a solution polymerization method, a suspension polymerization method, and an emulsion polymerization method.

100 parts by weight of all monomers preferably include 25 to 40 parts by weight of the (A) component and 50 to 74.5 parts by weight of the (B) component, more preferably include 30 to 40 parts by weight of the (A) component and 55 to 70 parts by weight of the (B) component. The copolymer latex is provided by copolymerizing at least the (A) component and the (B) component. In a case where the monomer consists of only the (A) component and the (B) component, the total amount is a sum of the (A) component and the (B) component. On the other hand, in a case where the copolymer latex contains other monomer component(s) in addition to the (A) component and the (B) component, the total amount is a sum of the (A) component, the (B) component and other monomer component(s).

(Aliphatic Conjugated Diene Monomer)

Examples of the (A) aliphatic conjugated diene monomer include 1,3-butadiene, isoprene, 2-chloro-1,3-butadiene, chloroprene, and 2,3-dimethyl-1,3-butadiene, 1,3-butadiene and isoprene are preferable and 1,3-butadiene is more preferable. The aliphatic conjugated diene monomer may be used alone or in combination of two or more thereof.

(Other Copolymerizable Vinyl Monomer)

Examples of the (B) copolymerizable other vinyl monomer include an aromatic vinyl compound, alkyl(meth)acrylate, a vinyl cyanide compound, vinyl acetate, an acrylic amide compound, N-methylol acrylic amide, and an ethylene-based unsaturated carboxylic acid monomer.

Examples of the aromatic vinyl compound include styrene, α-methyl styrene, p-methylstyrene, vinyl toluene, and chlorostyrene. Preferable is styrene.

Examples of alkyl(meth)acrylate used in the present invention include methyl(meth)acrylate, ethyl(meth)acrylate, propyl(meth)acrylate, butyl(meth)acrylate, 2-ethylhexyl(meth)acrylate, octyl(meth)acrylate, benzyl(meth)acrylate, lauryl(meth)acrylate, stearyl(meth)acrylate, isobornyl(meth)acrylate, 2-cyanoethyl(meth)acrylate, glycidyl(meth)acrylate, and 2-hydroxyethyl(meth)acrylate. Preferable is methyl(meth)acrylate and ethyl(meth)acrylate. More preferable is methyl(meth)acrylate.

Examples of the vinyl cyanide compound include acrylonitrile and methacrylonitrile. More preferable is acrylonitrile.

Examples of the acrylamide-based compound include acrylamideand N,N-dimethylaminopropyl(meth)acrylamide.

Examples of the ethylene-based unsaturated carboxylic acid monomer include monocarboxylic acids such as acrylic acid, methacrylic acid, and crotonic acid, dicarboxylic acids such as maleic acid, fumaric acid, and itaconic acid, and half esters such as methyl maleate, methyl itaconate, and β-metacryloxy ethyl acid hexahydrophthalate. Preferable is an acrylic acid and a methacylic acid.

The copolymerizable other vinyl monomer that is the (B) component may be used alone or in combination of two or more thereof. In a case where two or more thereof are mixed, at least ethylene-based unsaturated carboxylic acid monomer is preferably used in the mixture.

In the present invention, in order to provide good ink drying properties and fixing properties upon the inkjet recording especially with the pigment ink, the amount of the copolymer latex is from 3.0 parts by weight or more to 9.0 parts by weight or less, preferably from 5.0 parts by weight or more to 7.0 parts by weight or less based on 100 parts by weight of the inorganic pigment.

If the amount of the copolymer latex is less than 3.0 parts by weight, the ink is not sufficiently spread upon the inkjet recording and poor fixing occurs where excess ink is accumulated. If the amount of the copolymer latex exceeds 9.0 parts by weight, the ink is excessively spread, the gaps in the ink receiving layer are insufficient, and the ink drying properties are poor.

(Others)

The ink-receiving layer may contain a variety of binders other than the above-described starch and copolymer latex.

As the binders other than starch and copolymer latex, known binders used in general coating paper are usable, and are not especially limited. Examples include polyvinyl alcohols such as fully saponified polyvinyl alcohol, partially saponified polyvinyl alcohol, acetoacetylated polyvinyl alcohol, carboxy-modified polyvinyl alcohol, amide-modified polyvinyl alcohol, sulfonate-modified polyvinyl alcohol, butyral-modified polyvinyl alcohol, olefin-modified polyvinyl alcohol, nitrile-modified polyvinyl alcohol, pyrrolidone-modified polyvinyl alcohol, silicone-modified polyvinyl alcohol, silanol-modified polyvinyl alcohol, cation-modified polyvinyl alcohol, and terminal alkyl-modified polyvinyl alcohol; cellulose ether and its derivatives such as hydroxy ethyl cellulose, methyl cellulose, ethyl cellulose, carboxy methyl cellulose, and acetyl cellulose; polyacrylamides such as polyacrylamide, cationic polyacrylamide, anionic polyacrylamide, and amphoteric polyacrylamide; urethane resin such as polyester polyurethane resin, polyether polyurethane resin, polyurethane ionomer resin; unsaturated polyester resin, polyvinyl acetate, polyvinyl chloride, polyvinylidene chloride, polyacrylic ester, casein, gelatin, gum arabic, polyvinyl butyral, polystyrose, silicone resin, petroleum resin, terpene resin, ketone resin, coumarone resin or the like. These may be used in combination.

In the present invention, when the ink-receiving layer contains the binder (i.e., the above-described variety of binders) other than starch and copolymer latex, a total amount of starch and copolymer latex is preferably from 50 parts by weight or more to 100 parts by weight or less, more preferably from 75 parts by weight or more to 100 parts by weight or less, still preferably from 90 parts by weight or more to 100 parts by weight or less with respect to 100 parts by weight of all binders (total of starch and copolymer latex and the above-described variety of binders) contained in the ink-receiving layer. Particularly preferably, all binders contained in the ink-receiving layer are starch and copolymer latex, most preferably, all binders contained in the ink-receiving layer are starch and acrylonitrile butadiene copolymer.

(Other Components)

To the ink-receiving layer, as necessary, an auxiliary agent such as a pigment dispersant, a thickener, a water retention agent, a lubricant, a defoamer, a foam inhibitor, a releasing agent, a sizing agent, a printability improving agent (printability improver), a foaming agent, a coloring dye, a coloring pigment, a fluorescent dye, a preservative, a water resistant agent, a surfactant, a pH adjusting agent, an antistatic agent, an ultraviolet absorbing agent, and antioxidant may be added.

(Base)

As the base for the inkjet recording medium, any known ones may be used as long as they are in a sheet form. In view of a price and easy availability, the paper mainly composed of wood pulp is preferably used. As the wood pulp, pulp such as chemical pulp (bleached or unbleached softwood kraft pulp, bleached or unbleached hardwood kraft pulp or the like), mechanical pulp (ground pulp, thermomehanical pulp, chemical thermomechanical pulp or the like), and deinked pulp may be used alone or in combination at any ratio.

When the filler is added to the base, opacity and smoothness of the base is preferably enhanced. Examples of the filler include any known fillers such as hydrated silicate, white carbon, talc, kaolin, clay, calcium carbonate, titanium oxide, and synthetic resin filler. Depending on required quality, these may be used in combination.

In the present invention, when calcium carbonate is added to the base as the filler, the offset printing type texture is preferably easy provided.

Upon papermaking of the base, pH may be any of acidic, neutral, alkaline. A basis weight of the base is not especially limited. As necessary, an auxiliary agent such as aluminum sulfate, a sizing agent, a paper strengthening agent, a retention aid, a coloring agent, a dye, a defoamer, and a pH adjusting agent may be added to the base so long as the effect of the present invention is not impaired.

The base may be immersed in or coated with sizing solution containing starch, polyvinyl alcohol, a sizing agent or the like for the purpose of reinforcing the paper or adding sizing. The sizing solution may contain an auxiliary agent such as a fluorescent dye, a conductive agent, a water retention agent, a water resistant agent, a pH adjusting agent, a defoamer, a lubricant, a preservative, and a surfactant so long as the effect of the present invention is not impaired. A method of immersing or coating the sizing solution is not especially limited. Examples include an immersing method exemplified by a pound type size press or a coating method exemplified by a rod metering size press, a gate roll coater, and a blade coater.

(Layer Structure)

The ink-receiving layer may be disposed only one surface of the base, or disposed both surfaces of the base. The ink-receiving layer may be one or two or more. In the present invention, sufficient performance is obtained even if it is one layer. From the viewpoint of an enhancement of operation and a decrease in costs, the ink-receiving layer is preferably one layer.

In addition, in order to enhance smoothness of the ink-receiving layer, a precoat layer (undercoat layer) mainly containing the pigment and the binder described above, and is used in an offset printing medium may be disposed between the ink-receiving layer and the base. In the present invention, when the precoat layer (undercoat layer) is disposed, it is essential that an outermost layer of the inkjet recording medium is the ink-receiving layer.

(Coating Weight)

The coating weight of the ink receiving layer may be selected as appropriate depending on the desired quality and is not especially limited, but is preferably 0.5 g/m$^2$ or more per one surface in terms of a solid content, more preferably 6.0 g/m$^2$ or more per one surface in terms of the texture of the offset printing type and especially preferably 10.0 g/m$^2$ or more per one surface in terms of development of the white paper glossiness. The coating weight is preferably 30.0 g/m$^2$ or less per one surface in terms of the development of the texture of the offset printing type, improvement of surface strength of the ink receiving layer, and good fixing properties, more preferably 25.0 g/m$^2$ or less per one surface in terms of the color development, and especially preferably 20.0 g/m$^2$ or less per one surface in terms of the ink drying properties.

(Coating Method)

A method of coating the ink-receiving layer on the base is not especially limited. According to a known conventional technique, the ink-receiving layer can be coated. In addition, as a coating apparatus, a variety of general coating apparatuses such as a blade coater, a roll coater, an air knife coater, a bar coater, a gate roll coater, a curtain coater, a gravure coater, a flexo gravure coater, a spray coater, a size press may be used by on-machine or off-machine, as appropriate.

(White Paper Glossiness)

White paper glossiness of the surface of the ink receiving layer at a light incidence angle of 60 degrees according to JIS-Z8741 is not especially limited and can be set as appropriate depending on the applications. In particular, in order to provide a texture of glossy coating paper for offset printing, the white paper glossiness is preferably from 25% or more to 50% or less.

If the white paper glossiness is less than 25%, the texture is not of glossy coating paper but is of close to matte coating paper. The white paper glossiness is practically difficult to exceed 50%.

By using the pigment contained in the ink receiving layer having a small particle diameter or by using a calendar processing apparatus to perform a surface treatment on the inkjet recording medium, it allows the surface of the ink receiving layer to be tight, to thereby improving the white paper glossiness and providing the texture of glossy coating paper. However, using these methods, while the white paper glossiness is improved, the ink drying properties and the fixing properties are decreased. It is difficult to attain the both at the same time. In contrast, with the configuration of the present invention, since proper gaps are formed in the ink receiving layer, the white paper glossiness can be improved, and the texture of the glossy coating paper can be provided, it is possible to attain the both at the same time.

The white paper glossiness may be adjusted by using a variety of calendar processing apparatuses such as a hard nip calendar, a soft nip calendar, a super calendar, a shoe calendar by on-machine or off-machine, as appropriate after the ink-receiving layer is disposed, and appropriately adjusting and selecting a processing temperature, a processing speed, a processing linear pressure, processing stages, a diameter and a material of roll, or the like to process the surface.

(Air Permeability)

The air permeability of the inkjet recording medium according to J. TAPPI No. 5-2: 2000 is not especially limited. The air permeability is preferably from 5000 seconds or more to 11000 seconds or less such that the ink receiving layer has proper gaps. Thus, the ink is adequately spread upon the inkjet printing, lowering the image quality due to a non-printed portion (white-out portion) or bleeding is inhibited and the ink drying properties are improved.

If the air permeability of the inkjet recording medium is less 5000 seconds, ink is not sufficiently spread on the surface of the ink receiving layer in a plane direction, a non-printed portion (white-out portion) is produced, and the image quality may be lowered. On the other hand, if the air permeability of the inkjet recording medium exceeds 11000 seconds, the ink is excessively spread on the surface of the ink receiving layer, bleeding is generated, the image quality may be lowered, and the ink drying properties may be lowered.

More preferably, the air permeability is from 6000 seconds or more to 10000 seconds or less, further preferably, from 6500 seconds or more to 9500 seconds or less.

The ratio Y/X preferably satisfies the following formula: $12 \times 10^{-15} \leq Y/X \leq 11 \times 10^{-14}$, more preferably $13 \times 10^{-15} \leq Y/X \leq 40 \times 10^{-15}$, further preferably $15 \times 10^{-15} \leq Y/X \leq 30 \times 10^{-15}$, where X is an amount (g/m$^2$) of the engineered calcium carbonate per unit area of the ink receiving layer and Y is an amount of the water soluble organic solvent A (g/m$^2$) per dot area when the inkjet recording medium is dot printed with the inkjet ink.

When the Y/X is within the above-described range, the water soluble organic solvent A is promptly absorbed to the engineered calcium carbonate and the ink drying properties is further improved.

Note that if the ink receiving layers are formed on the both surfaces of the base, the Y/X is specified for each surface of the ink receiving layer.

<Inkjet Recording Method>

According to the inkjet recording method of the present invention, an inkjet recording medium described above is printed with inkjet ink described later. In particular, when the inkjet recording is performed by one-pass printing at a frequency of 20 kHz or more with a high ink-drying load, the present invention is more effectively applied. The one-pass printing is a method for printing for a predetermined printing region by single head scan. By the one-pass printing, a high-speed printing is possible. A driving frequency of the inkjet head is preferably 20 kHz or more (corresponding to a printing speed of 50 m/minute or more), more preferably 30 kHz or more (corresponding to a printing speed of 75 m/minute or more) from the viewpoint of enhancing the productivity of a printed matter. In addition, 2000 kHz or less is preferable, and 500 kHz or less is more preferable from the viewpoint of accuracy of a obtained printed image.

Note that in the present invention, the recording medium is not subject to pretreatment such as applying treatment liquid and the recording medium is directly printed.

As an inkjet (recording) head, there are a continuous type and a drop on demand type. In the drop on demand type, there are a piezo type and a thermal type. Non-limiting inkjet head can be used as long as the following inkjet ink can be used. From the viewpoint of flexibility of the ink composition, the piezo type is preferable.

From the viewpoint of enhancing the printing density and the texture of an offset printing type, resolution of the inkjet head is preferably 180×180 dpi or more, more preferably 360×360 dpi or more, still preferably 600×600 dpi or more. From the viewpoint of enhancing the discharging properties, 100000×100000 dpi or less is preferable. Note that the dpi (abbreviation of dot per inch) is a measure of the resolution and is a dot density for one inch.

From the viewpoint of enhancing the ink-drying properties, a size of an ink droplet discharged from the inkjet head is preferably 30 pl or less, more preferably 18 pl or less, still preferably 12 pl or less. From the viewpoint of enhancing the discharging properties, 0.0001 pl or more is preferable.

<Inkjet Ink>

The inkjet ink used in the present invention is water-based pigment ink including one or more types of pigment selected from self dispersed pigment and pigment containing water-insoluble polymer particles, from 10% by weight or more to 46% by weight or less of a water-soluble organic solvent A having a boiling point of 230° C. or less, from 0% by weight or more to 5% by weight or less of a water-soluble organic solvent B having a boiling point of 280 or more, and from 44% by weight or more to 70% by weight or less of water.

Unless otherwise noted, "weight part" and "% by weight" are values in terms of a solid content.

[Pigment]

A form of the pigment used in the present invention is one or more types of pigment selected from self dispersed pigment and pigment containing water-insoluble polymer particles. From the viewpoint of enhancing fixing strength to the inkjet recording medium, the form of the pigment is preferably the pigment containing water-insoluble polymer particles (hereinafter also referred to as "pigment containing polymer particles"). In addition, the inkjet ink contains the water-soluble organic solvent. Therefore, from the viewpoint of enhancing ink discharging stability and inhibiting the increase of dried ink viscosity, it is preferable that the water-soluble dispersant (water-soluble polymer) for dispersing the pigment in the ink is not contained.

Type of the pigment used in the inkjet ink of the present invention may be any inorganic pigment and organic pigment.

Examples of the inorganic pigment include carbon black, a metal oxide or the like. In particular, as the black ink, carbon black is preferable. Examples of carbon black include furnace black, thermal lamp black, acetylene black, channel black or the like.

Examples of the organic pigment include azo pigment, diazo pigment, phthalocyanine pigment, quinacridone pigment, isoindolinone pigment, dioxazine pigment, perylene pigment, perynone pigment, thioindigo pigment, anthraquinone pigment, quinophthalone pigment or the like.

A hue is not especially limited, and any chromatic color pigment including yellow, magenta, cyan, red, blue, orange, green or the like can be used.

[Self Dispersed Type Pigment]

The self dispersed type pigment that can be used in the present invention means the pigment that can be dispersed to an aqueous medium without using a surfactant or resin by bonding one or more of a hydrophilic functional group (anionic hydrophilic group such as a carboxy group and a sulfonate group, or cationic hydrophilic group such as a quaternary ammonium group) to the surface of the pigment directly or via other atomic group such as an alkanediyl group having a carbon number of 1 to 12. The self dispersed type pigment may be provided by chemically bonding a needed amount of the hydrophilic functional group to the surface of the pigment using a usual method.

Examples of commercially available self dispersed type pigment include CAB-O-JET 200, 300, 352K, 250A, 260M, 270Y, 450A, 465M, 470Y, 480V manufactured by Cabot Japan Corp., BONJET CW-1, CW-2 manufactured by Orient Chemical Industries, Co., Ltd., Aqua-Black 162 manufactured by Tokai Carbon Co., Ltd., SENSIJET BLACK SDP100, SDP1000, SDP2000 manufactured by SENSIENT INDUSTRIAL COLORS LLC. The self dispersed type pigment is preferably used as aqueous pigment dispersion dispersed in water.

[Pigment Containing Water-Insoluble Polymer Particles (Pigment Containing Polymer Particles)]

The pigment containing polymer particles are the particles where a water-insoluble polymer is attached to the surface of the pigment, and can disperse the pigment stably in water and ink by the water-insoluble polymer. Firstly, the water-insoluble polymer will be described.

(Water-Insoluble Polymer)

The water-insoluble polymer (corresponds to the following (a-1) to (a-3) components) refers to a polymer having a dissolved amount of 10 g or less, preferably 5 g or less, more preferably 1 g or less when the polymer is dried at 105° C.

for 2 hours to reach a constant weight, and dissolved in 100 g of water at 25 The dissolved amount of an anionic polymer is provided by neutralizing 100% of an anionic group of the polymer with sodium hydroxide.

Examples of the polymer used include polyester, polyurethane, vinyl polymer or the like. From the viewpoint of enhancing storage stability of aqueous ink, vinyl polymer provided by addition polymerization of a vinyl monomer (a vinyl compound, a vinylidene compound, a vinylene compound) is preferable.

The vinyl polymer is preferably provided by copolymerizing a monomer mixture including (a-1) an ionic monomer (hereinafter also referred to as "(a-1) component") and (a-2) a hydrophobic monomer (hereinafter also referred to as "(a-2) component") (hereinafter also referred to as "monomer mixture"). The vinyl polymer has a constituent unit derived from the (a-1) component and a constituent unit derived from the (a-2) component.

[(a-1) Ionic Monomer]

The (a-1) ionic monomer is preferably used for the monomer component of the water-insoluble polymer from the viewpoint of enhancing dispersion stability of the pigment containing polymer particles in the ink. Examples of the ionic monomer include an anionic monomer and a cationic monomer. The anionic monomer is preferable.

Examples of the anionic monomer include carboxylic acid monomer, sulfonic acid monomer, phosphoric acid monomer or the like.

Examples of the carboxylic acid monomer include acrylic acid, methacrylic acid, crotonic acid, itaconic acid, maleic acid, fumaric acid, citraconic acid, 2-methacryloyloxymethyl succinate or the like.

Among the above-described anionic monomer, from the viewpoint of enhancing the dispersion stability of the pigment containing polymer particles in the ink, a carboxylic acid monomer is preferable, and acrylic acid and methacrylic acid is more preferable.

[(a-2) Hydrophobic Monomer]

The (a-2) hydrophobic monomer is preferably used for the monomer component of the water-insoluble polymer from the viewpoint of enhancing the dispersion stability of the pigment containing polymer particles in the ink. Examples of the hydrophobic monomer include alkyl(meth)acrylate, an aromatic group containing monomer, a macromonomer or the like.

Preferable alkyl(meth)acrylate is that having an alkyl group having a carbon number of 1 to 22, preferably a carbon number of 6 to 18. Examples include methyl(meth)acrylate, ethyl(meth)acrylate, (iso) propyl(meth)acrylate, (iso or tertiary)butyl(meth)acrylate, (iso)amyl(meth)acrylate, cyclohexyl(meth)acrylate, 2-ethylhexyl(meth)acrylate, (iso)octyl(meth)acrylate, (iso)decyl(meth)acrylate, (iso)dodecyl (meth)acrylate, (iso)stearyl(meth)acrylate or the like.

Note that "(iso or tertiary)" and "(iso)" include the case that these groups are present or not present. If these groups are not present, it represents normal. In addition, "(meth)acrylate" represents acrylate and/or methacrylate.

As the aromatic group containing monomer, a vinyl monomer having a carbon number of 6 to 22 that may include a hetero atom containing substituent, and a styrenic monomer and aromatic group containing (meth) acrylate are more preferable.

As the styrenic monomer, styrene, 2-methylstyrene, and divinylbenzene are preferable, and styrene is more preferable.

Also, as the aromatic group containing (meth)acrylate, benzyl(meth)acrylate, phenoxyethyl(meth)acrylate or the like is preferable, and benzyl(meth)acrylate is more preferable.

The macromonomer is a compound having a polymerizable functional group at one end having a number average molecular weight of from 500 or more to 100,000 or less. From the viewpoint of enhancing the dispersion stability of the pigment containing polymer particles in the ink, it is preferably used as the monomer component of the water-insoluble polymer. As the polymerizable functional group at one end, an acryloyloxy group or a methacryloyloxy group is preferable, and methacryloyloxy group is more preferable.

A number average molecular weight of the macromonomer is preferably from 1,000 or more to 10,000 or less. The number average molecular weight is measured by gel permeation chromatography using chloroform containing 1 mmol/L of dodecyldimethylamine as a solvent using polystyrene as a reference material.

As the macromonomer, an aromatic group containing monomer based macromonomer and a silicone based macromonomer are preferable, and an aromatic group containing monomer based macromonomer is more preferable, from the viewpoint of enhancing the dispersion stability of the pigment containing polymer particles in the ink.

As the aromatic group containing monomer constituting the aromatic group containing monomer based macromonomer, the aromatic group containing monomers as described above are illustgrated. Styrene and benzyl(meth)acrylate are preferable, and styrene is more preferable.

Specific examples of the styrene based macromonomer include AS-6 (S), AN-6 (S), HS-6 (S) or the like manufactured by Toagosei, Co., Ltd.

Examples of the silicone based macromonomer include organopolysiloxane having a polymerizable functional group at one end.

As the (a-2) hydrophobic monomer, two or more kinds of the above-described monomers may be used. The styrenic monomer, the aromatic group containing (meth)acrylate, and the macromonomer may be used in combination. In particular, the macromonomer and other hydrophobic monomer may be preferably used in combination.

[(a-3) Nonionic Monomer]

In the water-insoluble polymer, (a-3) nonionic monomer (hereinafter also referred to as "(a-3) component") is preferably used as the monomer component, from the viewpoint of enhancing the dispersion stability of the pigment containing polymer particles in the ink. The nonionic monomer has high affinity for water and the water-soluble organic solvent, and a monomer including a hydroxy group or polyalkylene glycol, for example.

Examples of the (a-3) component include 2-hydroxyethyl (meth)acrylate; 3-hydroxypropyl(meth)acrylate; polyalkylene glycol(meth)acrylate such as polypropylene glycol (n=2 to 30, n represents an average addition molar number of an oxyalkylene group; the same shall apply hereinafter) (meth)acrylate, polyethylene glycol (meth)acrylate (n=2 to 30) and the like; alkoxypolyalkylene glycol (meth)acrylate such as methoxypolyethylene glycol (n=1 to 30) (meth) acrylate and the like; phenoxy(ethylene glycol-propylene glycol copolymer) (11=1 to 30, ethylene glycol therein: n=1 to 29) (meth)acrylate; or the like.

Specific examples of the commercially available (a-3) component include NK ester TM-20G, 40G, 90G, 230G or the like manufactured by Shin Nakamura Chemical, Co., Ltd., Blemmer PE-90, 200, 350, PME-100, 200, 400 or the like, PP-500, 800, 1000 or the like, AP-150, 400, 550 or the like, 50PEP-300, 50POEP-800B, 43PAPE-600B or the like manufactured by NOF Corporation.

The (a-1) to (a-3) components may be used alone or two or more in combination.

(Contents of Respective Component or Constituent Unit in Monomer Mixture or Polymer)

The contents of the (a-1) to (a-3) components in the monomer mixture (contents as unneutralized amount; the same shall apply hereinafter) or contents of the constituent unit derived from the (a-1) to (a-3) components in the water-insoluble polymer are as follows, from the viewpoint of enhancing the dispersion stability of the pigment containing polymer particles in the ink:

The content of the (a-1) component is preferably from 3% by weight or more to 40% by weight or less, more preferably from 5% by weight or more to 30% by weight or less, still preferably from 7% by weight or more to 20% by weight or less.

The content of the (a-2) component is preferably from 5% by weight or more to 86% by weight or less, more preferably from 10% by weight or more to 80% by weight or less, still preferably from 20% by weight or more to 60% by weight or less.

The content of the (a-3) component is preferably from 5% by weight or more to 60% by weight or less, more preferably from 10% by weight or more to 55% by weight or less, still preferably from 15% by weight or more to 40% by weight or less.

In addition, a weigh ratio of the [(a-1) component'(a-2) component] is preferably 0.01 to 1, more preferably 0.05 to 0.60, still preferably 0.10 to 0.30.

The ionic monomer (a-1) is a dispersing group using electrostatic repulsion in the ink, and the nonionic monomer (a-3) is a dispersing group using steric repulsion in the ink. When the nonionic monomer (a-3) is added to the hydrophobic monomer (a-2) and the ionic monomer (a-1), the stability of the pigment containing polymer particles in the ink is further enhancing, which results in the higher ink stability.

In addition, when the ink is dried, water is often volatilized at first. If water (dispersion medium having a high dielectric constant that most increases the electrostatic repulsion of dispersion among the dispersion media) in a dispersion medium (water, water-soluble organic solvents A, B) is decreased, the electrostatic repulsion of the dispersion is significantly lowered, the ink stability is lowered, and the discharging properties are degraded. By using the nonionic monomer (introducing a steric repulsion group) in addition to the ionic monomer, even under the condition that water is volatilized, the dielectric constant of the dispersion medium is lowered, and electrostatic repulsion group is less worked, the stability of the pigment containing polymer particles can be maintained high with the nonionic group (steric repulsion group).

(Production of Water-Insoluble Polymer)

The water-insoluble polymer is produced by copolymerizing the monomer mixture by a known polymerization method. As the polymerization method, solution polymerization is preferable.

The solvent used in the solution polymerization is not limited, a polar organic solvent such as aliphatic alcohol, ketones, ethers, esters and the like both having a carbon number of 1 to 3 is preferable. Specific examples include methanol, ethanol, acetone, and methylethylketone. From the viewpoint of the solubility of the solvent to the water-insoluble polymer, methylethylketone is preferable.

Upon the polymerization, a polymerization initiator and a polymerization chain transfer agent may be used. As the polymerization initiator, an azo compound is preferable, and 2,2'-azobis(2,4-dimethyl valeronitrile) is more preferable. As the polymerization chain transfer agent, mercaptans are preferable, and 2-mercaptoethanol is more preferable.

Preferable polymerization conditions depend on a kind of the polymerization initiator or the like. From the viewpoint of reactivity, a polymerization temperature is preferably from 50° C. or more and 90° C. or less, and a polymerization time is preferably from one hour to more to 20 hours or less. Polymerization atmosphere is preferably inert gas atmosphere such as nitrogen gas atmosphere, argon, or the like.

After completion of the polymerization reaction, the produced polymer can be isolated from a reaction solution by a known method such as reprecipitation, solvent evaporation, or the like. Also, an unreacted monomer or the like can be removed from the resultant polymer by reprecipitation, membrane separation, a chromatography method, an extraction method or the like.

The water-insoluble polymer is preferably used as a polymer solution as it is without removing the solvent used in the polymerization reaction in order to use the contained organic solvent as an organic solvent for use in Step 1 described later, from the viewpoint of improving productivity of aqueous dispersion of the pigment containing polymer particle.

A solid content concentration of the water-insoluble polymer solution is preferably 30 weight % or more, more preferably 40 weight % or more and preferably 60 weight % or less, more preferably 50 weight % or less from the viewpoint of improving productivity of aqueous dispersion of the pigment containing polymer particles.

A weight-average molecular weight of the water-insoluble polymer used in the present invention is preferably from 5,000 or more and 500,000 or less, more preferably from 10,000 or more to 300,000 or less, still preferably from 20,000 or more to 200,000 or less from the viewpoint of improving the dispersion stability of the pigment containing polymer particles in the ink, and from the viewpoint of improving ink fixing strength to the recording medium.

The weight-average molecular weight may be measured by the method in Examples as described later.

[Production of Pigment Containing Polymer Particles]

The pigment containing polymer particles may be effectively produced as the aqueous dispersion by a method including Step I and Step II described below.

When the pigment containing polymer particles are produced by the method including Steps I and II, the pigment and the polymer are not chemically bonded, but are in an irreversible adsorption state. The pigment and the polymer are always adsorbed, i.e., are present as the polymer particles containing the pigment in the ink. On the other hand, "water-insoluble polymer particles" may be used as the ink component as described later. While the pigment containing polymer particles are polymer particles containing pigment (pigment and polymer are irreversible adsorbed), the water-insoluble polymer particles are polymer particles containing no pigment.

Step I: step of providing dispersion of pigment containing polymer particles by dispersing a mixture containing water-insoluble polymer, an organic solvent, pigment, and water (hereinafter also referred to as "pigment mixture").

Step II: step of providing aqueous dispersion of pigment containing polymer particles (hereinafter also referred to as "aqueous pigment dispersion") by removing the organic solvent from the dispersion provided in Step I.

Although it is an optional step, Step III may be further performed:

Step III: step of providing aqueous dispersion by mixing the aqueous dispersion provided in Step II and a cross-linking agent, and cross-linking them.

(Step I)

In Step I, preferably, the water-insoluble polymer is firstly dissolved in the organic solvent. Next, the pigment, water, as necessary, a neutralizing agent, a surfactant or the like are added to and mixed with the resultant organic solvent solution to provide oil-in-aqueous dispersion. An order of adding the water-insoluble polymer to the organic solvent solution is not limited, but water, the neutralizing agent, and the pigment are preferably added in this order.

The organic solvent that dissolves the water-insoluble polymer is not limited. However, from the viewpoint of easily removing the organic solvent in Step II, aliphatic alcohol, ketones, ethers, esters or the like both having a carbon number of 1 to 3 are preferable, ketones are more preferable, and methylethylketone is further preferable. When the water-insoluble polymer is synthesized by the solution polymerization, the solvent used in the polymerization may be used as it is. As organic solvent removal processing is performed in Step II, the organic solvent is not included in the final pigment containing polymer particles.

When the water-insoluble polymer is the anionic polymer, the anionic groups in the water-insoluble polymer may be neutralized using the neutralizing agent. When the neutralizing agent is used, neutralization may be performed such that the pH is from 7 or more to 11 or less. Examples of the neutralizing agent include lithium hydroxide, sodium hydroxide, potassium hydroxide, ammonia, and bases such as various amines. The water-insoluble polymer may be neutralized in advance.

A degree of neutralization of the anionic groups of the water-insoluble polymer is preferably from 0.3 mol or more to 3.0 mol or less, more preferably from 0.4 mol or more to 2.0 mol or less, still preferably from 0.5 mol or more to 1.5 mol or less for one mole of the anionic group from the viewpoint of enhancing the dispersion stability of the pigment containing polymer particles in the ink and in the aqueorus pigment dispersion.

Here, the degree of neutralization is provided by dividing molar equivalent of the neutralizing agent by a molar quantity of the anionic groups of the water-insoluble polymer.

(Contents of Respective Components in Pigment Mixture)

Contents of the pigment in the pigment mixture are preferably from 10% by weight or more to 30% by weight or less, more preferably from 12% by weight or more to 27% by weight or less, and still preferably from 14% by weight or more to 25% by weight or less from the viewpoint of enhancing the dispersion stability of the pigment containing polymer particles in the ink and in the aqueorus pigment dispersion, and from the viewpoint of enhancing productivity of the aqueorus pigment dispersion.

Contents of the water-insoluble polymer in the pigment mixture are preferably from 2.0% by weight or more to 15% by weight or less, more preferably from 4.0% by weight or more to 12% by weight or less, and still preferably from 5.0% by weight or more to 10% by weight or less from the viewpoint of enhancing the dispersion stability of the aqueorus pigment dispersion and the storage stability and the discharging properties of the inkjet ink.

Contents of the organic solvent in the pigment mixture is preferably from 10% by weight or more to 35% by weight or less, more preferably from 12% by weight or more to 30% by weight or less, and still preferably from 15% by weight or more to 25% by weight or less from the viewpoint of enhancing wettability to the pigment and adsorption of the water-insoluble polymer to the pigment.

Contents of the water in the pigment mixture is preferably from 40% by weight or more to 75% by weight or less, more preferably from 42% by weight or more to 70% by weight or less, and from 50% by weight or more to 65% by weight or less from the viewpoint of enhancing the dispersion stability of the aqueorus pigment dispersion and from the viewpoint of enhancing productivity of the aqueorus pigment dispersion.

The weight ratio of the pigment to the water-insoluble polymer [pigment/water-insoluble polymer] is preferably 30/70 to 90/10, more preferably 40/60 to 85/15, still preferably 50/50 to 75/25 from the viewpoint of enhancing the dispersion stability of the aqueorus pigment dispersion and the storage stability and the discharging properties of the inkjet ink.

In Step I, the pigment mixture is dispersed to provide a dispersed product. A dispersion method of providing the dispersed product is not especially limited, Only by dispersing, an average particle size of the pigment particles may be made finer to a desirable particle size. Preferably, the pigment mixture is preliminary dispersed, and main dispersing is performed by adding shear stress so that the average particle size of the pigment particles is preferably controlled to be the desirable particle size.

The temperature of the preliminary dispersing in Step I is preferably 0° C. or more, and preferably 40° C. or less, more preferably 30° C. or less, still preferably 20° C. or less. The time for dispersing is preferably from 0.5 hour or more to 30 hours or less, more preferably from 1 hour or more to 20 hours or less, and still preferably from one hour or more to ten hours or less.

When the pigment mixture is preliminary dispersed, a mixing agitating device commonly used such as an anchor impeller and a disper impeller, and a high-speed agitating mixing device is preferable above all.

Examples of a means for providing a shear stress for main dispersing is a kneading machine such as a roll mill and a kneader, a high-pressure homogenizer such as a microfluidizer (manufactured by Microfluidics Co.), a media type dispersing device such as a paint shaker and beads mill. Examples of the media type dispersing device is Ultra Apex Mill (manufactured by KOTOBUKI KOGYOU.CO., LTD.), Pico Mill (manufactured by ASADA IRON WORKS.CO., LTD.) or the like. A plurality of the devices may be combined. Among them, the high-pressure homogenizer is preferably used from a standpoint of making finer the particle size of the pigment.

When the main dispersing is performed by using the high-pressure homogenizer, a processing pressure and the number of passes are controlled to control the particle size of the pigment to the desirable particle size.

The processing pressure is preferably from 60 MPa or more to 200 MPa or less, more preferably from 100 MPa or more to 180 MPa or less, still preferably from 130 MPa or more to 180 MPa or less from the viewpoint of productivity and economy.

The number of passes is preferably from three times or more to 30 times or less, more preferably from five times or more to 25 times or less.

(Step II)

In Step II, the organic solvent is removed from the resultant dispersion by a known method, thereby providing the aqueous dispersion of the pigment containing polymer particles. The organic solvent in the resultant aqueous dispersion including the pigment containing polymer particles is preferably substantially removed. As long as the object of the present invention is achieved, the organic solvent may remain. The amount of the remained organic solvent is preferably 0.1% by weight or less, more preferably 0.01% by weight or less.

As necessary, before the organic solvent is evaporated, the dispersion may be heated and agitated.

The resultant aqueous dispersion of the pigment containing polymer particles is that solid water-insoluble polymer particles containing pigment are dispersed in a medium including water as a main medium. Here, a form of the water-insoluble polymer particles is not especially limited, and the particles may be formed at least by the pigment and the water-insoluble polymer. For example, there are a particle form that the water-insoluble polymer includes the pigment, a particle form that the pigment is uniformly dispersed in the water-insoluble polymer, a particle form that the pigment is exposed on the surface of the water-insoluble polymer particles, and a mixture thereof.

(Step III)

Step III is an optional step, and is a step of mixing the aqueous dispersion obtained in Step II with the cross-linking agent and cross-linking them to provide the aqueous dispersion.

Here, when the water-insoluble polymer is the anionic water-insoluble polymer having the anionic groups, the cross-linking agent is preferably a compound having functional groups that react with the anionic groups, and more preferably a compound having two or more, preferably 2 to 6 of the above-mentioned functional groups in the molecule.

A preferable example of the cross-linking agent includes a compound having two or more epoxy groups in a molecule, a compound having two or more oxazoline groups in a molecule, and a compound having two or more isocyanate groups in a molecule. Among them, the compound having two or more epoxy groups in a molecule is preferable, and trimethylolpropane polyglycidyl ether is more preferable.

A non-volatile component concentration (solid content concentration) of the resultant aqueorus pigment dispersion is preferably from 10% by weight or more to 30% by weight or less, more preferably from 15% by weight or more to 25% by weight or less from the viewpoint of enhancing the dispersion stability of the aqueous pigment dispersion and from the viewpoint of easily preparing the inkjet ink.

The average particle size of the pigment containing polymer particles in the aqueorus pigment dispersion is preferably from 30 nm or more to 150 nm or less, more preferably from 40 nm or more to 130 nm or less, still preferably from 50 nm or more to 120 nm or less from the viewpoint of decreasing coarse particles and enhancing the discharging properties of the aqueous ink.

The average particle size of the pigment containing polymer particles is measured by the method in Examples as described later.

Also, the average particle size of the pigment containing polymer particles in the inkjet ink is the same as the average particle size in the aqueorus pigment dispersion, a preferable appearance of the average particle size is the same as a preferable appearance of the average particle size in the aqueorus pigment dispersion.

(Contents of Respective Components in Inkjet Ink)

The content of the pigment in the inkjet ink is preferably from 1.0% by weight or more to 15% by weight or less, more preferably from 2.0% by weight or more to 12% by weight or less, still preferably from 2.5% by weight or more to 10% by weight or less. If it is under the lower limit of the range, color properties of the inkjet ink may be lowered. If it exceeds the upper limit, the storage stability and the discharging properties of the inkjet ink may be lowered.

The content of the pigment containing polymer particles in the inkjet ink is preferably from 1.0% by weight or more to 20% by weight or less, more preferably from 3.0% by weight or more to 15% by weight or less, still preferably from 4.0% by weight or more to 10% by weight or less. If it is under the lower limit of the range, cob properties of the inkjet ink may be lowered. If it exceeds the upper limit, the storage stability and the discharging properties of the inkjet ink may be lowered.

The content of the water-insoluble polymer in the pigment containing polymer particles of the inkjet ink is preferably from 0.5% by weight or more to 10% by weight or less, more preferably from 0.8% by weight or more to 7.5% by weight or less, still preferably from 1.0% by weight or more to 5.0% by weight or less. If it is under the lower limit of the range, the discharging properties and the fixing properties of the inkjet ink may be lowered. If it exceeds the upper limit, the storage stability and the discharging properties of the inkjet ink may be lowered.

[Water-Soluble Organic Solvent]

[Water-Soluble Organic Solvent A Having Boiling Point of 230° C. or Less]

The water-soluble organic solvent A used in the present invention is not especially limited as long as the boiling point is 230° C. or less, may be liquid or solid at normal temperature, and may be freely used. The boiling point of the water-soluble organic solvent A preferably exceeds 100° C. from the viewpoint of the ink discharging properties. Here, the boiling point represents a normal boiling point (boiling point under 1 atm), Examples of the water-soluble organic solvent A (boiling point) include propylene glycol (188° C.), diethylene glycoldiethyl ether (189° C.), 1,2 butanediol (194° C.), ethylene glycol (198° C.), ethylene glycolmonoethyl ether (202° C.), 3-methyl-1,3 butanediol (203° C.), 1, 2 pentanedial (210° C.), 2-methyl-1,3 propanediol (214° C.), 1,2 hexanediol (224° C.), diethylene glycol monobuthyl ether (230° C.), 1,3 propanediol (230° C.), dipropylene glycol (230° C.) or the like. Two or more of them may be used in combination. The water-soluble organic solvent A preferably contains propylene glycol from the viewpoint of the ink-drying properties.

The content of the water-soluble organic solvent A in the inkjet ink is needed to be from 10% by weight or more to 46% by weight or less, preferably from 10% by weight or more to 44% by weight or less, more preferably from 15% by weight or more to 41% by weight or less, more preferably from 20% by weight or more to 36% by weight or less, more preferably from 25% by weight or more to 36% by weight or less from the viewpoint of enhancing the discharging properties and drying properties of the aqueous ink.

[Water-Soluble Organic Solvent Having Boiling Point of Above 230° C.]

In the present invention, a water-soluble organic solvent having boiling point of above 230° C. can be used from the viewpoint of enhancing the discharging properties. The boiling point of the water-soluble organic solvent having boiling point of above 230° C. is preferably 300° C. or less from the viewpoint of the ink-drying properties. Examples of the water-soluble organic solvent having boiling point of above 230° C. (boiling point) used in the present invention include dipropylene glycol (232° C.), diethylene glycol (244° C.), triethylene glycol monobutyl ether (271° C.), triethylene glycol (288° C.), glycerin (288° C.) or the like. Two or more of them may be used in combination.

The content of the water-soluble organic solvent having boiling point of above 230° C. in the inkjet ink is preferably 35% by weight or less, more preferably 15% by weight or less, still preferably 10% by weight or less from the viewpoint of enhancing the drying properties of the inkjet ink. The water-soluble organic solvent having boiling point of above 230° C. may not be included in the inkjet ink. In particular, the content of the water-soluble organic solvent having boiling point of above 280° C. is needed to be 5.0% by weight or less, preferably 3.0% by weight or less, The water-soluble organic solvent B may not be included in the inkjet ink.

[Water]

The content of the water in inkjet ink is needed to be from 44% by weight or more to 70% by weight or less, preferably from 45% by weight or more to 70% by weight or less, more preferably from 45% by weight or more to 65% by weight or less, and still preferably from 50% by weight or more to 65% by weight or less from the viewpoint of enhancing a dot diameter enlargement, the drying properties, color properties, the fixing properties when a low absorption recording medium is printed, and from the viewpoint of enhancing the ink discharging properties.

[Surfactant]

The inkjet ink may include a surfactant. In particular, a nonionic surfactant is preferable. Examples of the nonionic surfactant include alcoholic, acetylene glycolic, fluorine-based, or silicone-based surfactant. Two or more of them may be used in combination.

The surfactants are illustrated below.

There are (1) alkylether, alkenylether, alkynylether or arylether of polyoxyalkylene provided by adding ethylene oxide, propylene oxide or butylene oxide (hereinafter referred to as alkylene oxide) to straight-chain or branched-chain higher alcohol, polyalcohol or aromatic alcohol having a carbon number of 8 to 30 and saturated or unsaturated, e.g., polyoxyalkylene alkyl ether, polyoxyalkylene alkynyl ether, polyoxyalkylene aryl ether; (2) ester of straight-chain or branched-chain higher alcohol and polyfatty acid having a carbon number of 8 to 30 and saturated or unsaturated; (3) polyoxyalkylene aliphatic amine having a straight-chain or branched-chain alkyl group or alkyenyl group having a carbon number of 8 to 30; (4) an ester compound of a higher fatty acid having a carbon number of 8 to 22 and polyalcohol or a compound provided by adding alkylene oxide to it, e.g., sucrose fatty acid ester, glyceryl monofatty acid ester, fatty acid sorbitan ester, polyglycerin fatty acid ester, polyoxyalkylene sorbitan fatty acid ester, polyoxyethylene sorbit fatty acid ester, polyoxyalkylene glyceryl monofatty acid ester, polyoxyalkylene fatty acid ester or the like.

Other examples include higher fatty acid mono or diethanolamide or ethoxylate thereof having a carbon number of 8 to 22; polyoxyethylene hardened castor oil; an alkyl saccharide-based surfactant having a straight-chain or a branched-chain alkyl group, alkenyl group or alkyl phenyl group having a carbon number of 8 to 18; alkylamine oxide or alkylamide amine oxide having a straight-chain or a branched-chain alkyl group or alkenyl group having a carbon number of 8 to 22; a silicone-based surfactant such as polyoxyalkylene fatty acid amide, polyoxyalkylene alkyl amide, polyoxy modified silicone; a pluronic type or tetronic type block polymer surfactant, polyoxyalkylene lanoline alcohol, a polyethylene imine derivative or the like.

In straight-chain or branched-chain alkane, alkene or alkyn diol or triol having a hydroxy group and having a carbon number of 8 to 30, the hydroxy group may be present at any position, and an ethyleneoxy group, a propyleneoxy group, a butyleneoxy group may be added.

The alkane, alkene or alkyn diol having a carbon number of 8 to 30 has preferably hydroxy groups on the carbon atoms mutually adjacent. From the viewpoint of enhancing the discharging properties, total carbon numbers are preferably 8 to 22, more preferably 10 to 22, still preferably 10 to 18.

Examples of the commercially available diol surfactant include Surfynol 104PG-50, 104E, 104H, 104A manufactured by Nissin Chemical Co., Ltd., and Air Products & Chemicals, Inc. Examples of the ethylene oxide adduct type include Surfynol 420, 465, Acetylenol EH, Olfin E1010 or the like. Examples of the commercially available ethylene oxide adduct of higher alcohol include Emulgen 104P, 108, 109P, 120, 147, 150, 350, 404, 709 or the like manufactured by Kao Corporation. Examples of the commercially available ethylene oxide adduct of aliphatic amine include Amiet 102, 105, 302, 320 or the like.

Examples of the commercially available surfactant suitably usable for the inkjet ink include Surfynol 104PG50 manufactured by Nissin Chemical Co., Ltd., Emulgen 120 manufactured by Kao Corporation or the like.

The content of the surfactant in the inkjet ink is preferably from 0.6% by weight or more to 3.0% by weight or less, more preferably from 1.0% by weight or more to 3.0% by weight or less from the viewpoint of enhancing a dot diameter enlargement, the drying properties, color properties, the fixing properties when a low absorption recording medium is printed, and from the viewpoint of enhancing the ink discharging properties.

[Optional Components in Inkjet Ink]

Furthermore, a variety of additives such as no pigment containing water-insoluble polymer particles, a viscosity modifier, a defoamer, a preservative, an antifugal agent, a rust preventative and the like can be added to the inkjet ink.

Here, "no pigment containing water-insoluble polymer particles" are polymer particles excluding the above-described pigment containing polymer particles, and are added with the aim of enhancing the fixing properties.

[Water-Insoluble Polymer Particles]

Examples of the components of the water-insoluble polymer particles include acrylic resin, styrenic resin, urethane resin, polyester resin, styrene acrylic resin, butadiene resin, styrene-butadiene resin, vinyl chloride resin, vinyl acetate resin, acrylic silicone resin or the like. Among them, the acrylic resin is preferable from the viewpoint of speeding up drying on paper, and enhancing rubfastness of a printed matter obtained by printing a recording medium having low absorption properties.

In addition, the water-insoluble polymer particles are preferably used as dispersion including the water-insoluble polymer particles from the viewpoint of enhancing the productivity of aqueous ink. Synthesized water-insoluble polymer particles or commercially available water-insoluble polymer particles may be used as appropriate.

Examples of the commercially available dispersion of the water-insoluble polymer particles include acrylic resin such as "Neocryl A1127" (anionic self crosslinking aqueous acrylic resin manufactured by DSM NeoResins Inc.) and "Joncyl 390" (manufactured by BASF Japan Co., Ltd.), urethane resin such as "WBR-2018", "WBR-2000U" (manufactured by Taisei Fine Chemical Co., Ltd.), styrene-butadiene resin such as "SR-100", "SR102" (manufactured by Nippon A&L Inc.), styrene-acrylic resin such as "Joncryl 7100", "Joncryl 734", "Joncryl 538' (manufactured by BASF Japan Co., Ltd.) and vinyl chloride resin such as "Vinyblan 701" (manufactured by Nissin Chemical Co., Ltd.) or the like.

A form may be dispersion where the water-insoluble polymer particles are dispersed in water. The dispersion of the water-insoluble polymer particles fix ink droplets discharged from an inkjet nozzle to the recording medium, and enhance the fixing properties.

The content of the polymer particles in the dispersion containing the water-insoluble polymer particles is preferably from 10% by weight or more to 70% by weight or less, more preferably from 20% by weight or more to 60% by weight or less, still preferably from 30% by weight or more to 55% by weight or less in the inkjet ink from the viewpoint of the dispersion stability of the water-insoluble polymer particles and convenience of ink blending.

The dispersion is provided by dispersing the water-insoluble polymer particles (100% solid) to the dispersion medium (main component is water). By handing as the form of the dispersion, the productivity of the ink can be enhanced as described above.

The content of the water-insoluble polymer particles in the inkjet ink is preferably from 0.1% by weight or more to 10% by weight or less, more preferably from 1.0% by weight or more to 7.5% by weight or less, still preferably from 1.0% by weight or more to 5.0% by weight or less from the viewpoint of the ink fixing properties. If it is under the lower limit of the range, the fixing properties of the inkjet ink may be lowered. If it exceeds the upper limit, the storage stability and the discharging properties of the inkjet ink may be lowered.

Example 1

Hereinafter, the present invention will be further described in greater detail through examples. In the examples, respective physical properties were measured by the following methods. Note that "parts" and "%" denote "parts by weight" and "% by weight" unless otherwise noted.

(1) Measurement of Weight-Average Molecular Weight of Water-Insoluble Polymer

An eluent was prepared by dissolving phosphoric acid and lithium bromide into N,N-dimethylformamide so that each concentration was 60 mmol/L and 50 mmol/L. Using the eluent, a molecular weight of the water-insoluble polymer was measured by gel permeation chromatography [GPA apparatus (HLA-8120GPA), column (TSK-GEL, $\alpha$-M×2) manufactured by Toso Corporation, flowrate: 1 mL/min]. As a reference material, monodisperse polystyrene having a known molecular weight was used.

(2) Measurement of Solid Content Concentration of Aqueous Dispersion of Pigment Containing Polymer Particles 10.0 g of sodium sulfate that was to be constant weight in a desiccator was weighed into a 30 mL ointment container, and about 1.0 g of the aqueous dispersion of the pigment containing polymer particles was added and mixed. The mixture was measured for weight accurately, and maintained at 105° C. for 2 hours. Volatile components were removed. The mixture was allowed to be stand for further 15 minutes in the desiccator, and the weight was measured. The weight of the pigment containing polymer particles after the volatile components were removed was regarded as the solid content, which was divided by the weight of the added sample (aqueous dispersion=pigment containing polymer particles+ dispersion medium) to provide the solid content concentration.

(3) Measurement of Average Particle Size of Pigment Containing Polymer Particles Measurement was made using a laser particle analysis system (model: ELS-8000, Cumulant analysis, manufactured by Otsuka Electronics, Co., Ltd.,). The dispersion used was diluted with water so that the concentration of the pigment containing polymer particles to be measured was about $5\times10^{-3}$% by weight. The measurement conditions were: temperature at 25° C., angle between the incident light and the detector of 90°, cumulative number of 100. As a refractive index of the dispersion solvent, the refractive index of water (1.333) was entered.

(4) pH of Inkjet Ink

A desk top type pH meter "F-71" (manufactured by HORIBA Ltd.) using a pH electrode "6337-10D" (manufactured by HORIBA Ltd.) was used to measure the pH of the ink at 25° C.

<Preparation of Pigment Containing Polymer Particles>

Preparation Example I (Preparation of Water-Insoluble Polymer (a-1) Solution)

To a reaction vessel equipped with two dropping funnels, the monomer, the solvent, the polymerization initiator (2,2'-azobis (2,4-dimethyl valeronitrile) (manufactured by Wako Pure Chemical Industries, Ltd., product name: V-65B), the polymerization chain transfer agent (2-mercaptethanol) (manufactured by Kishida Chemical Co., Ltd.) shown in Table 1 "initially charged monomer solution" were charged, mixed, and purged with nitrogen gas to provide an initially charged monomer solution.

Next, the monomer, the solvent, the polymerization initiator, and the polymerization chain transfer agent shown in Table 1 "dropping monomer solution 1" were mixed to provide a dropping monomer solution 1, which was charged to a dropping funnel 1, and purged with nitrogen gas. The monomer, solvent, the polymerization initiator, and the polymerization chain transfer agent shown in Table 1 "dropping monomer solution 2" were mixed to provide a dropping monomer solution 2, which was charged to a dropping funnel 2, and purged with nitrogen gas.

Styrenic macromer in each Table is a 50% by weight toluene solution having a number average molecular weight 6000 manufactured by Toagosei Co., Ltd. under the product name: AS-6S, Blemmer PP1000 is a product name of polypropylene glycol monomethacrylate (propylene oxide average addition molar number=5, terminal: hydrogen atom) manufactured by NOF Corporation. The polymerization initiator V-65B is a product name of 2,2'-azobis (2,4-dimethyl valeronitrile) manufactured by Wako Pure Chemical Industries, Ltd. NK ester TM-40G is a product name of methoxy polyethylene glycol monomethacrylate (ethylene oxide average addition molar number=4) manufactured by Shin Nakamura Chemical, Co., Ltd.

Methacrylic acid and styrene in each Table are reagents manufactured by Wako Pure Chemical Industries, Ltd., and lauryl methacrylate is a reagent manufactured by Tokyo Chemical Industry Co., Ltd.

The initially charged monomer solution in the reaction vessel was stirred under nitrogen atmosphere, and was maintained at 77° C. The dropping monomer solution 1 in the dropping funnel 1 was gradually dropped into the reaction vessel for 3 hours. Then, the dropping monomer solution 2 in the dropping funnel 2 was gradually dropped into the reaction vessel for 2 hours. After dropping, the mixture solution in the reaction vessel was stirred at 77° C. for 0.5 hours.

Then, the polymerization initiator solution was prepared by dissolving 1.1 parts of the above-described polymerization initiator (V-65B) into 47.3 parts of methylethylketone (manufactured by Wako Pure Chemical Industries, Ltd.,), was added to the mixture solution, and stirred at 77° C. for 0.5 hour to be matured. Further, the polymerization initiator solution was prepared, added and matured 12 times. Then, the reaction solution in the reaction vessel was maintained at 80° C. for 1 hour, and 8456 parts of methylethylketone was added so that the solid content concentration was 36.0%, thereby providing the water-insoluble polymer a-1 solution. The water-insoluble polymer a-1 had the weight-average molecular weight of 82,000.

A monomer charging ratio in each of Table 1 to Table 3 is a value at a solid content of 50% in the styrenic macromer, and is a value at a solid content of 100% in other monomers. A monomer solution charging amount in each of Table 1 to Table 3 is a value in the solution.

TABLE 1

|  | Initially charged monomer solution (parts) | Dropping monomer solution 1 (parts) | Dropping monomer solution 2 (parts) | Monomer charged percentage (weight %) |
| --- | --- | --- | --- | --- |
| Methacrylic acid |  | 1152 | 288 | 16.0 |
| Styrene | 396 | 3168 | 396 | 44.0 |
| Styrenic macromer | 270 | 2430 |  | 15.0 |
| Blemmer PP1000 | 225 | 1800 | 225 | 25.0 |
| Methylethylketone | 157.5 | 1732.5 | 1260 |  |
| Polymerization initiator V-65B |  | 72 | 18 | Average molecular weight Mw |
| Mercaptoethanol | 1.3 | 8.82 | 2.52 | 82000 |

Preparation Example II (Preparation of Water-Insoluble Polymer a-2 Solution)

The water-insoluble polymer (a-2) solution (polymer solid content concentration 36%) was provided as shown in Table 2 in accordance with the preparation method described in Preparation example I except that Blemmer PP1000 was replaced with NK ester TM-40G in "initially charged monomer solution" in Table 1. The weight-average molecular weight of the water-insoluble polymer (a-2) was 67,000.

TABLE 2

|  | Initially charged monomer solution (parts) | Dropping monomer solution 1 (parts) | Dropping monomer solution 2 (parts) | Monomer charged percentage (weight %) |
| --- | --- | --- | --- | --- |
| Methacrylic acid |  | 1152 | 288 | 16.0 |
| Styrene | 396 | 3168 | 396 | 44.0 |
| Styrenic macromer | 270 | 2430 |  | 15.0 |
| NK ester TM-40G | 225 | 1800 | 225 | 25.0 |
| Methylethylketone | 157.5 | 1732.5 | 1260 |  |
| Polymerization initiator V-65B |  | 72 | 18 | Average molecular weight Mw |
| Mercaptoethanol | 1.3 | 8.82 | 2.52 | 67000 |

Preparation Example III (Preparation of Water-Insoluble Polymer a-3 Solution)

The water-insoluble polymer (a-3) solution (polymer solid content concentration 36%) was provided using the initially charged monomer solution, the dropping monomer solution 1, and the dropping monomer solution 2 in Table 3 in accordance with the preparation method described in Preparation example I. The weight-average molecular weight of the water-insoluble polymer (a-3) was 53,000.

TABLE 3

|  | Initially charged monomer solution (parts) | Dropping monomer solution 1 (parts) | Dropping monomer solution 2 (parts) | Monomer charged percentage (weight %) |
| --- | --- | --- | --- | --- |
| Methacrylic acid |  | 1100 | 288 | 14.0 |
| Styrene | 671 | 5200 | 671 | 66.0 |
| Lauryl methacrylate | 200 | 1780 |  | 20.0 |
| Methylethylketone | 157.5 | 1732.5 | 1260 |  |

TABLE 3-continued

|  | Initially charged monomer solution (parts) | Dropping monomer solution 1 (parts) | Dropping monomer solution 2 (parts) | Monomer charged percentage (weight %) |
|---|---|---|---|---|
| Polymerization initiator V-65B |  | 72 | 18 | Average molecular weight Mw |
| Mercaptoethanol | 1.3 | 8.82 | 2.52 | 53000 |

Preparation Example IV (Preparation of Aqueous Dispersion of Pigment Containing Polymer Particles A)

178.7 parts of the water-insoluble polymer (a-1) solution (solid content concentration 36.0%) provided in Preparation example I were mixed with 45 parts of methylethylketone (MEK) to provide the MEK solution of the water-insoluble polymer (a-1). Into a vessel with a volume of 2 L having a disper impeller, the MEK solution of the water-insoluble polymer (a-1) was charged, which was stirred at 1400 rpm. 511.4 parts of ion exchange water, 22.3 parts of a 5N sodium hydroxide solution (manufactured by Wako Pure Chemical Industries, Ltd.,), and 1.7 parts of a 25% ammonia water solution (manufactured by Wako Pure Chemical Industries, Ltd.,) were added thereto. The mixture was adjusted such that the degree of neutralization by sodium hydroxide was 78.8 mol %, and the degree of neutralization by ammonia was 21.2 mol %, and was stirred at 1400 rpm for 15 minutes while cooling in a water bath at 0° C.

Then, 214 parts of carbon black (manufactured by Cabot Japan Corp., product name: MONARCH 880) was added, which was stirred at 6400 rpm for 1 hour. The resultant pigment mixture was 9-pass dispersed processed at a pressure of 150 MPa using Microfluidizer "M-7115" (manufactured by Microfluidics Co.) to provide a dispersed product (solid content concentration was 25.0%), 324.5 parts of the dispersed product provided in the above-described Step were charged into a 2 L eggplant flask, to which 216.3 parts of ion exchange water was added (solid content concentration 15.0%). Using a "rotary evaporator" (N-1000S, manufactured by Tokyo Rikakikai Co., Ltd.), the mixture was held at a rotation number of 50rimin in a warm bath adjusted to 32° C. at a pressure of 0.09 MPa for 3 hours to remove the organic solvent. Furthermore, the warm bath was adjusted to 62° C., the pressure was decreased to 0.07 MPa, and the mixture was concentrated to have the solid content concentration of 25%.

The resultant concentrated product was charged into 500 ml angle rotor, and was centrifuged using a high-speed cooling centrifuge (himaa AR22G, manufactured by Hitachi Kaki Co., Ltd., setting temperature 20° C.) at 7000 rpm for 20 minutes. Thereafter, a liquid layer portion was filtered using a 1.2 μm filter (MAP-010XS manufactured by Roki Techno Co., Ltd.).

To 300 parts of the resultant filtrate (57.7 parts of the pigment, 17.3 parts of the water-insoluble polymer a-1), 0.68 parts of Proxel LV (5) (manufactured by Lonza Japan, fungicide, active component 20%) was added, and 40.23 parts of ion exchange water was further added so that the solid content concentration was 22.0%, which was stirred at room temperature for 1 hour to provide the aqueous dispersion of the pigment containing polymer particles A (aqueorus pigment dispersion; average particle size 105 nm, pH 9.0).

The aqueous dispersion of the pigment containing polymer particles A is referred to as "aqueous dispersion A".

Preparation Example V (Preparation of Aqueous Dispersion of Pigment Containing Polymer Particles B)

To 100 parts of the aqueous dispersion A, 0.27 parts of an epoxy cross-linking agent (trimethylol propane polyglycidyl ether, manufactured by Nagase ChemteX Corporation, product name: Denacol EX321L, epoxy equivalent 129) was added (corresponding to 25 mol % to carboxylic acid being a cross-linking reaction point contained in methacrylic acid of the polymer), and 0.95 parts of ion exchange water was added thereto so that the solid content concentration was 22.0%. The mixture was stirred at 70° C. for 5 hours, was cooled to room temperature, thereby providing the aqueous dispersion of the pigment containing polymer particles B (aqueorus pigment dispersion; average particle size 106 nm, pH 9.9).

The aqueous dispersion of the pigment containing polymer particles B is referred to as "aqueous dispersion B".

Preparation Example VI (Preparation of Aqueous Dispersion of Pigment Containing Polymer Particles C)

The aqueous dispersion of the pigment containing polymer particles C (aqueorus pigment dispersion; average particle size 95 nm, pH 9.0) was provided in accordance with the preparation method in Preparation example IV except that the water-insoluble polymer (a-1) was replaced with the water-insoluble polymer (a-2) described in Preparation example II.

The aqueous dispersion of the pigment containing polymer particles C is referred to as "aqueous dispersion C".

Preparation Example VII (Preparation of Aqueous Dispersion of Pigment Containing Polymer Particles D)

The aqueous dispersion of the pigment containing polymer particles D (aqueorus pigment dispersion; average particle size 115 nm, pH 9.0) was provided in accordance with the preparation method in Preparation example IV except that the water-insoluble polymer (a-1) was replaced with the insoluble polymer (a-3) described in Preparation example II.

The aqueous dispersion of the pigment containing polymer particles D is referred to as "aqueous dispersion D".

Preparation Example VIII (Preparation of Aqueous Dispersion of Pigment Containing Polymer Particles F)

The aqueous dispersion of the pigment containing polymer particles F (aqueorus pigment dispersion; average particle size 120 nm, pH 8.5) was provided in accordance with the preparation method in Preparation example IV except that carbon black was replaced with azo pigment (Pigment Yellow 74, manufactured by Sanyo Color Works, LTD., Product name: Fast Yellow 7414), The aqueous dispersion of the pigment containing polymer particles F is referred to as "aqueous dispersion F".

Preparation Example IX (Preparation of Aqueous Dispersion of Pigment Containing Polymer Particles G)

The aqueous dispersion of the pigment containing polymer particles G (aqueorus pigment dispersion; average particle size 125 nm, pH 8.9) was provided in accordance with the preparation method in Preparation example IV except that carbon black was replaced with quinacridone pigment (Pigment Red 122, manufactured by DIC Corporation, Product name: FASTGEN SUPER MAGENTA RGT).

The aqueous dispersion of the pigment containing polymer particles G is referred to as "aqueous dispersion G".

Preparation Example X (Preparation of Aqueous Dispersion of Pigment Containing Polymer Particles H)

The aqueous dispersion of the pigment containing polymer particles H (aqueorus pigment dispersion; average particle size 100 nm, pH 9.0) was provided in accordance with the preparation method in Preparation example IV except that carbon black was replaced with copper phthalocyanine pigment (Pigment Blue15: 3, manufactured by DIC Corporation, Product name: FASTGEN BLUE TGR-SD).

The aqueous dispersion of the pigment containing polymer particles H is referred to as "aqueous dispersion H".

<Preparation of Pigment Dispersed with Water Soluble Polymer>

Preparation Example XI (Preparation of Aqueous Dispersion of Pigment I Dispersed with Water Soluble Polymer)

The aqueous dispersion of the pigment I dispersed with water soluble polymer (aqueorus pigment dispersion; average particle size 95 nm, pH 9.1) was provided in accordance with the preparation method in Preparation example IV except that styrene-acrylic acid copolymer (product name: Joncyl 68 (manufactured by BASF Japan Co., Ltd.) was used as water soluble polymer in place of the water-insoluble polymer (a-1).

The aqueous dispersion of the pigment I is referred to as "aqueous dispersion I".

<Preparation of Inkjet Ink>

Preparation Example 1 (Preparation of Ink 1)

To 41.3 parts of the aqueous dispersion A described in Preparation example IV (corresponds to a pigment concentration 7% in the ink, solid content concentration 22%), 35 parts of propylene glycol (manufactured by Wako Pure Chemical Industries, Ltd.), 0.3 parts of Surfynol 104PG50 (manufactured by Nissin Chemical Co., Ltd., solid content concentration 50%, propylene glycol 50%), 0.6 parts of Emulgen 120 (manufactured by Kao Corporation), 5.0 parts of glycerin (manufactured by Kao Corporation), and water (which gave 100 parts of the ink) were added, which was stirred at room temperature for 30 minutes, and then was filtrated with 1.2 µm filter (MAP-010XS) to provide ink 1.

Preparation Example 2 (Preparation of Ink 2)

Ink 2 was provided in accordance with the preparation method in Preparation example 1 except that the water-soluble organic solvent was replaced with 25 parts of propylene glycol, 5 parts of diethylene glycol (manufactured by Wako Pure Chemical Industries, Ltd.,), 5.0 parts of glycerin, Preparation Example 3 (Preparation of Ink 3)

Ink 3 was provided in accordance with the preparation method in Preparation example 1 except that the water-soluble organic solvent was replaced with 35 parts of propylene glycol and 10 parts of diethylene glycol.

Preparation Example 4 (Preparation of Ink 4)

Ink 4 was provided in accordance with the preparation method in Preparation example 1 except that the water-soluble organic solvent was replaced with 35 parts of propylene glycol.

Preparation Example 5 (Preparation of Ink 5)

Ink 5 was provided in accordance with the preparation method in Preparation example 1 except that the water-soluble organic solvent was replaced with 35 parts of propylene glycol and 5.0 parts of diethylene glycol, and the surfactant was replaced with 1.0 parts of Surfynol 104PG50 and 1.0 parts of Emulgen 120.

Preparation Example 6 (Preparation of Ink 6)

Ink 6 was provided in accordance with the preparation method in Preparation example 1 except that the water-soluble organic solvent was replaced with 25 parts of propylene glycol, and the surfactant was replaced with 1,5 parts of Surfynol 104PG50 and 1.5 parts of Emulgen 120.

Preparation Example 7 (Preparation of Ink 7)

Ink 7 was provided in accordance with the preparation method in Preparation example 5 except that the water-soluble organic solvent was replaced with 25 parts of propylene glycol and 4.5 parts of the water-insoluble polymer particles Neocryl A1127 (corresponds to the water-insoluble polymer particles 2% in the ink, manufactured by DSM NeoResins, Inc., solid content concentration 44% by weight, average particle size 65 nm, pH 7,7) was added.

Preparation Example 8 (Preparation of Ink 8)

Ink 8 was provided in accordance with the preparation method in Preparation example 7 except that the aqueous dispersion A was replaced with 41.9 parts of the aqueous dispersion B in Preparation example V (corresponding to pigment concentration 7% in the ink).

Preparation Example 9 (Preparation of Ink 9)

Ink 9 was provided in accordance with the preparation method in Preparation example 7 except that the aqueous dispersion A was replaced with the aqueous dispersion C in Preparation example VI.

Preparation Example 10 (Preparation of Ink 10)

Ink 10 was provided in accordance with the preparation method in Preparation example 7 except that the aqueous dispersion A was replaced with the aqueous dispersion D in Preparation example VII.

Preparation Example 11 (Preparation of Ink 11)

Ink 11 was provided in accordance with the preparation method in Preparation example 7 except that 41.3 parts of the aqueous dispersion A was replaced with 46.7 parts of self dispersion type pigment manufactured by SENSIENT INDUSTRIAL COLORS LLC (product name SENSIJET BLACK SDP100, dispersion E, solid content concentration 15%).

Preparation Example 12 (Preparation of Ink 12)

Ink 12 was provided in accordance with the preparation method in Preparation example 4 except that the water-soluble organic solvent was replaced with 35 parts of 1,2 butanediol (manufactured by Tokyo Chemical Industry Co., Ltd.

Preparation Example 13 (Preparation of Ink 13)

Ink 13 was provided in accordance with the preparation method in Preparation example 4 except that the water-soluble organic solvent was replaced with 35 parts of 3-methyl 1,3 butanediol (manufactured by Tokyo Chemical Industry Co., Ltd.).

Preparation Example 14 (Preparation of Ink 14)

Ink 14 was provided in accordance with the preparation method in Preparation example 4 except that the water-soluble organic solvent was replaced with 35 parts of 1,2 pentane diol (manufactured by Tokyo Chemical Industry Co., Ltd.).

Preparation Example 15 (Preparation of Ink 15)

Ink 15 was provided in accordance with the preparation method in Preparation example 4 except that the water-soluble organic solvent was replaced with 35 parts of 1,2 hexanediol (manufactured by Tokyo Chemical Industry Co., Ltd.).

Preparation Example 16 (Preparation of Ink 16)

Ink 16 was provided in accordance with the preparation method in Preparation example 4 except that the water-soluble organic solvent was replaced with 35 parts of diethylene glycol monobutyl ether (manufactured by Tokyo Chemical Industry Co., Ltd.

Preparation Example 17 (Preparation of Ink 17)

Ink 17 was provided in accordance with the preparation method in Preparation example 1 except that the water-soluble organic solvent was replaced with 40 parts of propylene glycol.

Preparation Example 18 (Preparation of Ink 18)

Ink 18 was provided in accordance with the preparation method in Preparation example 1 except that the water-soluble organic solvent was replaced with 43 parts of propylene glycol.

Preparation Example 19 (Preparation of Ink 19)

Ink 19 was provided in accordance with the preparation method in Preparation example 1 except that the water-soluble organic solvent was replaced with 45 parts of propylene glycol.

Preparation Example 20 (Preparation of Ink 20)

Ink 20 was provided in accordance with the preparation method in Preparation example 4 except that the aqueous dispersion A was replaced with the aqueous dispersion F in Preparation example VIII.

Preparation Example 21 (Preparation of Ink 21)

Ink 21 was provided in accordance with the preparation method in Preparation example 4 except that the aqueous dispersion A was replaced with the aqueous dispersion G in Preparation example IX.

Preparation Example 22 (Preparation of Ink 22)

Ink 22 was provided in accordance with the preparation method in Preparation example 4 except that the aqueous dispersion A was replaced with the aqueous dispersion H in Preparation example X.

Preparation Example 23 (Preparation of Ink 23)

Ink 23 was provided in accordance with the preparation method in Preparation example 1 except that the water-soluble organic solvent was replaced with 40 parts of diethylene glycol.

Preparation Example 24 (Preparation of Ink 24)

Ink 24 was provided in accordance with the preparation method in Preparation example 1 except that the water-soluble organic solvent was replaced with 20 parts of propylene glycol and 10 parts of glycerin.

Preparation Example 25 (Preparation of Ink 25)

Ink 25 was provided in accordance with the preparation method in Preparation example 5 except that the water-soluble organic solvent was replaced with 10 parts of propylene glycol and 5 parts of diethylene glycol, Preparation Example 26 (Preparation of Ink 26))

Ink 26 was provided in accordance with the preparation method in Preparation example 1 except that the water-soluble organic solvent was replaced with 30 parts of glycerin.

Preparation Example 27 (Preparation of Ink 27)

Ink 27 was provided in accordance with the preparation method in Preparation example 4 except that the aqueous dispersion A was replaced with the aqueous dispersion I in Preparation example XI, and the water-soluble organic solvent was replaced with 30 parts of propylene glycol.

Preparation Example 28 (Preparation of Ink 28)

Ink 28 was provided in accordance with the preparation method in Preparation example 1 except that the water-soluble organic solvent was replaced with 48 parts of propylene glycol.

Table 4 shows compositions (solid contents) of the inkjet ink. Note that propylene glycol includes that derived from Surfynol 104PG50 being the surfactant.

TABLE 4

| | | | | | Water-soluble organic solvent Water-soluble organic solvent A (boiling point 230° C. or less) | | | |
|---|---|---|---|---|---|---|---|---|
| | | Surfactant | | | | | | |
| Preparation Example | aquaous dispersion | Surfynol 104PG50 | Emulgen 120 | Total amount | Propylene glycol | 1,2butanediol | 3-methyl 1,3butanediol | 1,2pentanediol |
| Boiling point of water-soluble organic solvent (° C.) | | | | | 188 | 194 | 203 | 210 |
| 1 | A | 0.15 | 0.60 | 0.75 | 35.15 | | | |
| 2 | A | 0.15 | 0.60 | 0.75 | 25.15 | | | |
| 3 | A | 0.15 | 0.60 | 0.75 | 35.15 | | | |
| 4 | A | 0.15 | 0.60 | 0.75 | 35.15 | | | |
| 5 | A | 0.50 | 1.00 | 1.50 | 35.50 | | | |
| 6 | A | 0.75 | 1.50 | 2.25 | 25.75 | | | |
| 7 | A | 0.50 | 1.00 | 1.50 | 25.50 | | | |
| 8 | B | 0.50 | 1.00 | 1.50 | 25.50 | | | |
| 9 | C | 0.50 | 1.00 | 1.50 | 25.50 | | | |
| 10 | D | 0.50 | 1.00 | 1.50 | 25.50 | | | |
| 11 | E | 0.50 | 1.00 | 1.50 | 25.50 | | | |
| 12 | A | 0.15 | 0.60 | 0.75 | 0.15 | 35.0 | | |
| 13 | A | 0.15 | 0.60 | 0.75 | 0.15 | | 35.0 | |
| 14 | A | 0.15 | 0.60 | 0.75 | 0.15 | | | 35.0 |
| 15 | A | 0.15 | 0.60 | 0.75 | 0.15 | | | |
| 16 | A | 0.15 | 0.60 | 0.75 | 0.15 | | | |
| 17 | A | 0.15 | 0.60 | 0.75 | 40.15 | | | |
| 18 | A | 0.15 | 0.60 | 0.75 | 43.15 | | | |
| 19 | A | 0.15 | 0.60 | 0.75 | 45.15 | | | |
| 20 | F | 0.15 | 0.60 | 0.75 | 35.15 | | | |
| 21 | G | 0.15 | 0.60 | 0.75 | 35.15 | | | |
| 22 | H | 0.15 | 0.60 | 0.75 | 35.15 | | | |
| 23 | A | 0.15 | 0.60 | 0.75 | 0.15 | | | |
| 24 | A | 0.15 | 0.60 | 0.75 | 20.15 | | | |
| 25 | A | 0.50 | 1.00 | 1.50 | 10.50 | | | |
| 26 | A | 0.15 | 0.60 | 0.75 | 0.15 | | | |
| 27 | I | 0.15 | 0.60 | 0.75 | 30.15 | | | |
| 28 | A | 0.15 | 0.60 | 0.75 | 48.15 | | | |

| | Water-soluble organic solvent | | | | Water-insoluble | |
|---|---|---|---|---|---|---|
| | Water-soluble organic solvent A (boiling point 230° C. or less) | | Others | Water-soluble organic solvent B | polymer particles | Water Ion |
| Preparation Example | 1,2hexandiol | Diethylene glycol monobuthyl ether | Diethylene glycol | (b.p. 280° C. or more) glycerin | Neocryl A1127 | exchange water |
| Boiling point of water-soluble organic solvent (° C.) | 224 | 230 | 244 | 290 | — | — |
| 1 | | | | 5.0 | | 49.2 |
| 2 | | | 5.0 | 5.0 | | 54.2 |
| 3 | | | 10.0 | | | 44.2 |
| 4 | | | | | | 54.2 |
| 5 | | | 5.0 | | | 47.4 |
| 6 | | | | | | 60.6 |
| 7 | | | 5.0 | | 2.0 | 55.4 |
| 8 | | | 5.0 | | 2.0 | 55.4 |
| 9 | | | 5.0 | | 2.0 | 55.4 |
| 10 | | | 5.0 | | 2.0 | 57.5 |
| 11 | | | 5.0 | | 2.0 | 57.5 |
| 12 | | | | | | 54.2 |
| 13 | | | | | | 54.2 |
| 14 | | | | | | 54.2 |
| 15 | 35.0 | | | | | 54.2 |
| 16 | | 35.0 | | | | 54.2 |
| 17 | | | | | | 49.2 |

TABLE 4-continued

Inkjet ink (composition: wt %)

| # | | | | |
|---|---|---|---|---|
| 18 | | | | 46.2 |
| 19 | | | | 44.2 |
| 20 | | | | 54.2 |
| 21 | | | | 54.2 |
| 22 | | | | 54.2 |
| 23 | 40.0 | | | 49.2 |
| 24 | | | 10.0 | 59.2 |
| 25 | | 5.0 | | 72.4 |
| 26 | | | 30.0 | 59.2 |
| 27 | | | | 59.2 |
| 28 | | | | 41.2 |

<Production of Inkjet Recording Medium>

In the following production of inkjet recording media A to S, "parts" and "%" denote "parts by weight" and "% by weight" in terms of a solid content unless otherwise noted. The coating weight is a solid content per one surface.

<Base>

0.5 parts of a paper strengthening agent (cationized starch), 0.55 parts of aluminum sulfate and 13 parts of calcium carbonate were added to 100 parts of the pulp material consisting of 87 parts of bleached hardwood kraft pulp (LBKP) having a CSF of 390 ml and 13 parts of bleached softwood kraft pulp (NBKP) having the CSF of 480 ml to provide a paper stock. The base having a basis weight of 80 g/m2 was made from the paper stock using a fourdrinier paper making machine.

<Coating Color for Ink-Receiving Layer>

A blend below was stirred and dispersed in a ratio (parts by weight) shown in Table 5 to provide the coating color for the ink receiving layer.

| | |
|---|---|
| Engineered ground calcium carbonate (manufactured by Fimatec Ltd., product name: FMT-OP, $D_{50}$: 0.7 μm, $D_{75}/D_{25}$ by the X-ray transmission sedimentation particle size distribution measurement method: 2.6) | 75 parts |
| Kaolin (manufactured by Thiele GmbH & Co., product name: kaofine, $D_{50}$: 0.3 μm) | 25.0 parts |
| Organic pigment (manufactured by Zeon Corporation, product name: LX407BP9, Tg: 60° C.) | 6.0 parts |
| Starch (manufactured by Penford Corporation, product name: PG295) | 6.0 part |
| Copolymer latex (manufactured by JSR Corporation, product name: NP-150) | 6.0 parts |
| Water | 32.0 parts |

In each of Preparation examples C, D, E, F, and P, the coating color for the ink receiving layer was produced similar to Preparation example A except that engineered calcium carbonate ($D_{50}$: 0.2 μm, $D_{75}/D_{25}$: 2.8), engineered calcium carbonate ($D_{50}$: 0.3 μm, $D_{75}/D_{25}$: 2.7), engineered calcium carbonate ($D_{50}$: 1.2 μm, $D_{75}/D_{25}$: 2.6), engineered calcium carbonate ($D_{50}$: 2.0 μm, $D_{75}/D_{25}$: 2.6), or engineered calcium carbonate ($D_{50}$: 0.8 μm, $D_{75}/D_{25}$: 3.5) was used in place of the engineered ground calcium carbonate (manufactured by Fimatec Ltd., product name: FMT-PO, $D_{50}$: 0.7 μm, $D_{75}/D_{25}$: 2.6).

Table 5 shows each $D_{50}$ value of calcium carbonate. $D_{50}$ was measured by the above-described laser particle size measuring apparatus (Mastersizer S type manufactured by Malvern Instruments Ltd., light source: red right, 633 nm (He—Ne laser), blue right, 466 nm (LED). Upon the measurement, the dispersion where calcium carbonate is dispersed in water was used. $D_{25}$ and $D_{75}$ were measured by the X-ray transmission sedimentation particle size distribution measurement apparatus (Sedigraph 5100 manufactured by Micromeritics Instrument Corp.), as described above.

In each of Preparation examples G and H, the coating color for the ink receiving layer was produced similar to Preparation example A except that kaolin (manufactured by KaMin LLC., product name: Hydragloss, $D_{50}$: 0.2 μm) or kaolin (manufactured by Imerys Co., product name: Contour extreme, $D_{50}$: 1.5 μm) was used in place of Kaolin (manufactured by Thiele GmbH & Co., product name: kaofine, $D_{50}$: 0.3 μm).

Table 5 shows each $D_{50}$ value of kaolin. $D_{50}$ was measured by the laser particle size measuring apparatus (Mastersizer S type manufactured by Malvern Instruments Ltd., light source: red right, 633 nm (He—Ne laser), blue right, 466 nm (LED), as described above.

Then, the coating color for the ink-receiving layer was coated on one surface of the base using a blade coater such that a total of the inorganic pigment in terms of a solid content per one surface was the value shown in Table 5. Thereafter, drying was done. Then, calendaring was performed twice by a soft nip calender (linear pressure: 150 kN/m, roll temperature: 40° C.) to produce each inkjet recording medium in each Preparation example shown in Table 5.

The air permeability of each inkjet recording medium was measured according to J. TAPPI No. 5-2: 2000

TABLE 5

| | Ink receiving layer | | | | | | | | | |
|---|---|---|---|---|---|---|---|---|---|---|
| | Inorganic pigment | | | | | | Binder | | | |
| | Engineered calcium carbonate | | | Kaolin | | Organic pigment | | Starch | Copolymer latex | | |
| Preparation example | Blending amount (parts by weight) | D50 (μm) | D75/D25 | Blending amount (parts by weight) | D50 (μm) | Blending amount (parts by weight) | Tg (° C.) | Blending amount (parts by weight) | Blending amount (parts by weight) | Coating amount (g/m²) | Air permeability (sec) |
| A | 75 | 0.7 | 2.6 | 25 | 0.3 | 6.0 | 60 | 1.0 | 6.0 | 18.0 | 7500 |
| B | 55 | 0.7 | 2.6 | 45 | 0.3 | 6.0 | 60 | 1.0 | 6.0 | 18.0 | 10000 |

TABLE 5-continued

| | Ink receiving layer | | | | | | | | | | |
|---|---|---|---|---|---|---|---|---|---|---|---|
| | Inorganic pigment | | | | | Organic pigment | | Binder | | | |
| | Engineered calcium carbonate | | | Kaolin | | | | Starch | Copolymer latex | | |
| Preparation example | Blending amount (parts by weight) | D50 (μm) | D75/D25 | Blending amount (parts by weight) | D50 (μm) | Blending amount (parts by weight) | Tg (° C.) | Blending amount (parts by weight) | Blending amount (parts by weight) | Coating amount (g/m$^2$) | Air permeability (sec) |
| C | 75 | 0.2 | 2.8 | 25 | 0.3 | 6.0 | 60 | 1.0 | 6.0 | 18.0 | 9500 |
| D | 75 | 0.3 | 2.7 | 25 | 0.3 | 6.0 | 60 | 1.0 | 6.0 | 18.0 | 8500 |
| E | 75 | 1.2 | 2.6 | 25 | 0.3 | 6.0 | 60 | 1.0 | 6.0 | 18.0 | 7000 |
| F | 75 | 2.0 | 2.6 | 25 | 0.3 | 6.0 | 60 | 1.0 | 6.0 | 18.0 | 7000 |
| G | 75 | 0.7 | 2.6 | 25 | 0.2 | 6.0 | 60 | 1.0 | 6.0 | 18.0 | 9500 |
| H | 75 | 0.7 | 2.6 | 25 | 1.5 | 6.0 | 60 | 1.0 | 6.0 | 18.0 | 7500 |
| I | 75 | 0.7 | 2.6 | 25 | 0.3 | 6.0 | 60 | 1.0 | 6.0 | 5.0 | 5500 |
| J | 75 | 0.7 | 2.6 | 25 | 0.3 | 6.0 | 60 | 1.0 | 6.0 | 30.0 | 10000 |
| K | 40 | 0.7 | 2.6 | 60 | 0.3 | 6.0 | 60 | 1.0 | 6.0 | 18.0 | 13000 |
| L | 85 | 0.7 | 2.6 | 15 | 0.3 | 6.0 | 60 | 1.0 | 6.0 | 18.0 | 4500 |
| M | 95 | 0.7 | 2.6 | 5 | 0.3 | 6.0 | 60 | 1.0 | 6.0 | 18.0 | 4000 |
| N | 75 | 0.7 | 2.6 | 25 | 0.3 | 6.0 | 60 | 0.0 | 6.0 | 18.0 | 8500 |
| O | 75 | 0.7 | 2.6 | 25 | 0.3 | 6.0 | 60 | 1.0 | 0.0 | 18.0 | 3000 |
| P | 75 | 0.8 | 3.5 | 25 | 0.3 | 6.0 | 60 | 1.0 | 6.0 | 18.0 | 16000 |
| Q | 75 | 0.7 | 2.6 | 25 | 0.3 | 0.0 | 60 | 1.0 | 6.0 | 18.0 | 8500 |
| R | 75 | 0.7 | 2.6 | 25 | 0.3 | 12.0 | 60 | 1.0 | 6.0 | 18.0 | 13000 |
| S | 75 | 0.7 | 2.6 | 25 | 0.3 | 6.0 | 10 | 1.0 | 6.0 | 18.0 | 12000 |

<Evaluation of Printed Matter by Inkjet Recording>

The inkjet recording was performed using the inkjet ink and each inkjet recording medium shown in Table 4 and Table 5. The printed matter was produced by the following method and evaluated.

<Production of Printed Matter>

The inkjet ink shown in Table 4 was charged to a printing evaluation apparatus for one-pass printing (manufactured by Tritek Co., Ltd.) equipped with the inkjet head "KJ4B-QA06NTB-STDV" or "KJ4B-YH06WST-STDV" (manufactured by Kyocera Corporation) at a temperature of 23±1° C. and a relative humidity of 50±5%.

The setting was as follows: a head voltage of 26V, a head temperature of 32° C., a resolution of 600 dpi, number of flushing times before discharging of 200, and a negative pressure of −4.0 kPa, A frequency (20, 30 kHz for KJ4B-QA06NTB-STDV, and 40 kHz for KJ4B-YH06WST-STDV), and a liquid drop size upon ink discharging were as described in Table 6 and Table 7.

The inkjet recording medium was fixed to a conveyer of the printing evaluation apparatus under a reduced pressure so that a longitudinal direction of the inkjet recording medium and a conveying direction were the same.

A printing command was transferred to the printing evaluation apparatus. A solid image with 100% injection amount (600×600 dpi), and an image with 10% injection amount (for measuring a dot diameter) were printed on the ink-receiving layer of the inkjet recording medium using the inkjet ink to produce a printed matter.

<Evaluation 1: Measurement of Ratio Y/X of Content X (g/m$^2$) of Calcium Carbonate Per Unit Area of Inkjet Recording Medium and Amount Y (g/m$^2$) of Water-Soluble Organic Solvent A Per Dot Area>

Firstly, Y (g/m$^2$) was determined as follows: an image was provided using a handy type image evaluation system PIAS (registered trademark)-II (manufactured by QEA Corporation, using high resolution optical module) so that 10 points or more of ink dots were included for 1 field of view on the printed matter (image with 10% injection amount). An average particle size of each dot within the image was calculated. The measurement was performed for 5 fields of view, and the average particle sizes in the respective fields of view were averaged to employ as the average dot diameter.

An average particle size of each dot was determined by recognizing an ink part (=dots) by binarizing the image (differentiating the recording medium from the ink part) from a circle diameter corresponding to the area of the ink part (dots).

$$\text{average dot diameter (μm)} = \sqrt{(4A/\pi)}; A = \text{dot area (μm}^2\text{)}$$

In addition, an area of a perfect circle having the average dot diameter was calculated, and was regarded as the dot area. Next, the content (g) of the water-soluble organic solvent A in one dot was calculated by a percentage (%) of the water-soluble organic solvent A in the ink×the liquid drop size (pl: picoliter=×10$^{-15}$ m$^3$)×ink specific gravity of 1.05 (g/cm$^3$) from the content of the water-soluble organic solvent A in the inkjet ink and the liquid drop size being a specific gravity of the inkjet ink regarded as 1.05. Then, Y (g/m$^2$) was determined.

From Table 5, the content X (g/m$^2$) of calcium carbonate was determined per unit area of the ink-receiving layer (printed surface) of the inkjet recording medium to calculate Y/X.

<Evaluation 2. Evaluation of Drying Properties>

A 450 g weight was prepared around which a plain paper (product name: Xerox 4200) was wound. After 5 seconds and 10 seconds of printing the printed matter (solid image), the weight was placed on the solid image for 5 seconds. The printing density of the surface of the plain paper wound around the weight on which the color was attached (contact surface with the solid image) was measured. The printing density was measured for 10 points on the contact surface of the paper using an optical densitometer "SpeatroEye" (manufactured by GretagMacbeth LLC) in a measurement mode (ANSI, Pap, Pol), and the average value was determined. The smaller the value is, the better the drying properties are.

The evaluation was made by the following standards. When the evaluation is Good or Not Bad, there is no practical problem.
(Evaluation Standards)

| Good: printing density | 0.1 or less (printed surface is substantially dried) |
| --- | --- |
| Not Bad: printing density | exceeding 0.11 to 0.15 (a part of printed surface is insufficiently dried) |
| Bad: printing density | exceeding 0.15 (printed surface is insufficiently dried) |

<Evaluation 3. Evaluation of Fixing Properties>

A 450 g weight was prepared around which a plain paper (product name: Xerox 4200) was wound. After 5 minutes of printing the printed matter (solid image), the weight was placed on the solid image for reciprocatively sliding 20 times. The printing density of the surface of the plain paper wound around the weight on which the color was attached (contact surface with the solid image) was measured. The measurement was made similar to Evaluation 2 for 5 points on the contact surface of the paper, and the average value was determined. The smaller the value is, the better the fixing properties are.

The evaluation was made by the following standards. When the evaluation is Good or Not Bad, there is no practical problem.
(Evaluation Standards)

| Good: printing density | 0.2 or less (almost no peeling off on printed surface) |
| --- | --- |
| Not Bad: printing density | exceeding 0.2 to 0.4 (a little peeling off on printed surface) |
| Bad: printing density | exceeding 0.4 (greatly peeling off on printed surface) |

<Evaluation 4. Evaluation of Printing Density>

After the printed matter (solid image) was allowed to stand at a temperature of 23±1° C. and a relative humidity of 50±5% for one day, the printing density of the solid image for any 10 points was measured using the optical densitometer "SpeatroEye" (manufactured by GretagMacbeth LLC), and the average value was determined. The greater the value is, the better color properties are.

When a numerical value is 1.70 or more, it is good.

<Evaluation 5. Evaluation of Glossiness>

After the printed matter (solid image) and the surface of the ink-receiving layer non-printed (white paper) were allowed to stand at a temperature of 23±1° C. and a relative humidity of 50±5% for one day, 60° glossiness according to JIS-Z8741 was measured five times using a glossmeter (manufactured by Nippon Denshoku Industries, Co., Ltd., product name: HANDY GLOSSMETER, part number: PG-1), and the average value was determined. The greater the value is, the higher glossiness is.

In the glossy coating paper for offset printing, it is good when the 60° glossiness (white paper glossiness) at the non-printed part is 25% or more and when the 60° glossiness at the printed part is 25% or more.

<Evaluation 6. Evaluation of Offset Printing Texture>

After the printed matter (solid image) was allowed to stand at a temperature of 23±1° C. and a relative humidity of 50±5% for one day, surface feelings on both of the surface of the ink-receiving layer as the printed surface on which the solid image was printed and the surface of the ink-receiving layer as the non-printed surface of the white paper were evaluated visually by the following standards:

When the evaluation is Good or Not Bad, there is no practical problem.
(Evaluation Standards)
  Good: offset printing type texture is provided.
  Not Bad: offset printing type-like texture is provided.
  Bad: no offset printing type texture is provided.

<Evaluation 7. Evaluation of Discharging Properties>

Each combination of the inkjet ink and the inkjet recording medium in each Example was printed by the printing evaluation apparatus, and was allowed to stand for 30 minutes without protecting a nozzle surface. Thereafter, a pattern for distinguishing the discharge from all nozzles (2656 nozzles) was printed on both side high quality plain paper <recycled paper> (manufactured by Seiko Epson Corporation, model KA4250NPDR). Unusable nozzle numbers (clogged nozzle that do not discharge normally) was counted, and the discharge properties were evaluated by the following standards: The smaller the unusable nozzle numbers are, the better the discharging properties are.

When the evaluation is Good or Not Bad, there is no practical problem.
(Evaluation Standards)
  Good: No unusable nozzles
  Not Bad: Unusable nozzles are 1 to 5
  Bad: Unusable nozzles are 6 or more
Table 6 to Table 8 show the results.

TABLE 6

| | Inkjet ink No. | Inkjet recording medium Preparation example | Ink discharging conditions | | Content of water-soluble organic solvent A in one dot ($\times 10^{-21}$ g) | Average dot diameter ($\times 10^{-6}$ m) | Y ($\times 10^{-15}$ g/m$^2$) | Y/X ($\times 10^{-15}$) |
| --- | --- | --- | --- | --- | --- | --- | --- | --- |
| | | | Frequency (kHz) | Liquid drop size (pI) | | | | |
| Example 1 | 1 | A | 30 | 12 | 4.43 | 71.0 | 279.8 | 29.4 |
| Example 2 | 1 | A | 30 | 7 | 2.58 | 65.0 | 194.7 | 20.5 |
| Example 3 | 1 | A | 30 | 5 | 1.85 | 58.5 | 171.7 | 18.1 |
| Example 4 | 1 | A | 20 | 12 | 4.43 | 71.5 | 275.9 | 29.0 |
| Example 5 | 2 | A | 30 | 12 | 3.17 | 72.0 | 194.7 | 20.5 |
| Example 6 | 3 | A | 30 | 12 | 4.43 | 71.5 | 275.9 | 29.0 |
| Example 7 | 3 | A | 30 | 7 | 2.58 | 66.0 | 188.9 | 19.9 |
| Example 8 | 3 | A | 30 | 5 | 1.85 | 59.0 | 168.8 | 17.8 |
| Example 9 | 3 | A | 20 | 12 | 4.43 | 72.0 | 272.1 | 28.6 |
| Example 10 | 3 | A | 40 | 12 | 4.43 | 71.5 | 275.9 | 29.0 |

TABLE 6-continued

| | | | | | | | | | |
|---|---|---|---|---|---|---|---|---|---|
| Example 11 | 4 | A | 30 | 12 | 4.43 | 72.0 | 272.1 | 28.6 | |
| Example 12 | 5 | A | 30 | 12 | 4.47 | 86.0 | 192.6 | 20.3 | |
| Example 13 | 6 | A | 30 | 12 | 3.24 | 91.0 | 124.8 | 13.1 | |
| Example 14 | 5 | A | 30 | 7 | 2.61 | 79.5 | 131.5 | 13.8 | |
| Example 15 | 5 | A | 30 | 5 | 1.86 | 68.0 | 128.4 | 13.5 | |
| Example 16 | 5 | A | 20 | 12 | 4.47 | 90.5 | 173.9 | 18.3 | |
| Example 17 | 5 | A | 40 | 12 | 4.47 | 86.5 | 190.4 | 20.0 | |
| Example 18 | 7 | A | 30 | 12 | 3.21 | 84.0 | 145.0 | 15.3 | |
| Example 19 | 8 | A | 30 | 12 | 3.21 | 85.0 | 141.6 | 14.9 | |
| Example 20 | 9 | A | 30 | 12 | 3.21 | 83.5 | 146.8 | 15.4 | |

| | Drying properties | | Fixing properties | | 60° glossiness | | Glossy offset printing texture | Air permeability (sec) | |
|---|---|---|---|---|---|---|---|---|---|
| | After 5 sec of printing | After 10 sec of printing | After 5 minutes of printing | Printing density | Printed matter | White paper | | White paper | Discharging properties |
| Example 1 | 0.07 | 0.05 | 0.17 | 2.03 | 57 | 33 | Good | 7500 | Good |
| Example 2 | 0.06 | 0.04 | 0.16 | 1.96 | 54 | 33 | Good | 7500 | Good |
| Example 3 | 0.05 | 0.04 | 0.16 | 1.86 | 52 | 33 | Good | 7500 | Good |
| Example 4 | 0.07 | 0.06 | 0.16 | 2.04 | 56 | 33 | Good | 7500 | Good |
| Example 5 | 0.07 | 0.05 | 0.15 | 2.05 | 57 | 33 | Good | 7500 | Good |
| Example 6 | 0.06 | 0.03 | 0.16 | 2.06 | 58 | 33 | Good | 7500 | Good |
| Example 7 | 0.05 | 0.04 | 0.14 | 1.92 | 54 | 33 | Good | 7500 | Good |
| Example 8 | 0.05 | 0.04 | 0.13 | 1.77 | 53 | 33 | Good | 7500 | Good |
| Example 9 | 0.07 | 0.05 | 0.15 | 2.06 | 57 | 33 | Good | 7500 | Good |
| Example 10 | 0.06 | 0.04 | 0.16 | 2.09 | 58 | 33 | Good | 7500 | Good |
| Example 11 | 0.05 | 0.04 | 0.12 | 2.06 | 57 | 33 | Good | 7500 | Good |
| Example 12 | 0.06 | 0.05 | 0.15 | 2.01 | 56 | 33 | Good | 7500 | Good |
| Example 13 | 0.06 | 0.04 | 0.16 | 2.03 | 59 | 33 | Good | 7500 | Not Bad |
| Example 14 | 0.07 | 0.05 | 0.15 | 1.94 | 57 | 33 | Good | 7500 | Good |
| Example 15 | 0.06 | 0.04 | 0.14 | 1.85 | 51 | 33 | Good | 7500 | Good |
| Example 16 | 0.07 | 0.04 | 0.16 | 2.19 | 61 | 33 | Good | 7500 | Good |
| Example 17 | 0.08 | 0.05 | 0.15 | 2.25 | 58 | 33 | Good | 7500 | Good |
| Example 18 | 0.08 | 0.05 | 0.08 | 2.04 | 56 | 33 | Good | 7500 | Good |
| Example 19 | 0.07 | 0.04 | 0.09 | 2.12 | 59 | 33 | Good | 7500 | Good |
| Example 20 | 0.09 | 0.05 | 0.09 | 1.91 | 61 | 33 | Good | 7500 | Good |

TABLE 7

| | Inkjet ink No. | Inkjet recording medium Preparation exampl | Ink discharging conditions | | Content of water-soluble organic solvent A in one dot ($\times 10^{-21}$ g) | Average dot diameter ($\times 10^{-6}$ m) | Y ($\times 10^{-15}$ g/m$^2$) | Y/X ($\times 10^{-15}$) |
|---|---|---|---|---|---|---|---|---|
| | | | Frequency (kHz) | Liquid drop size (pl) | | | | |
| Example 21 | 10 | A | 30 | 12 | 3.21 | 83.0 | 148.5 | 15.6 |
| Example 22 | 11 | A | 30 | 12 | 3.21 | 80.0 | 159.9 | 16.8 |
| Example 23 | 12 | A | 30 | 12 | 4.43 | 71.5 | 275.9 | 29.0 |
| Example 24 | 13 | A | 30 | 12 | 4.43 | 72.0 | 272.1 | 28.6 |
| Example 25 | 14 | A | 30 | 12 | 4.43 | 72.5 | 268.3 | 28.2 |
| Example 26 | 15 | A | 30 | 12 | 4.43 | 72.0 | 272.1 | 28.6 |
| Example 27 | 16 | A | 30 | 12 | 4.43 | 72.5 | 268.3 | 28.2 |
| Example 28 | 1 | B | 30 | 12 | 4.43 | 71.0 | 279.8 | 34.5 |
| Example 29 | 1 | C | 30 | 12 | 4.43 | 70.5 | 283.8 | 29.8 |
| Example 30 | 1 | D | 30 | 12 | 4.43 | 71.0 | 279.8 | 29.4 |
| Example 31 | 1 | E | 30 | 12 | 4.43 | 71.0 | 279.8 | 29.4 |
| Example 32 | 1 | F | 30 | 12 | 4.43 | 71.5 | 275.9 | 29.0 |
| Example 33 | 1 | G | 30 | 12 | 4.43 | 72.0 | 272.1 | 28.6 |
| Example 34 | 1 | H | 30 | 12 | 4.43 | 73.0 | 264.7 | 27.8 |
| Example 35 | 1 | I | 30 | 12 | 4.43 | 70.0 | 287.9 | 109.0 |
| Example 36 | 1 | J | 30 | 12 | 4.43 | 71.5 | 275.9 | 17.4 |
| Example 37 | 17 | A | 30 | 12 | 5.06 | 71.0 | 319.6 | 33.6 |
| Example 38 | 18 | A | 30 | 12 | 5.44 | 71.5 | 338.7 | 35.6 |
| Example 39 | 19 | A | 30 | 12 | 5.69 | 72.0 | 349.3 | 36.8 |
| Example 40 | 20 | A | 30 | 12 | 4.43 | 71.5 | 275.9 | 29.0 |
| Example 41 | 21 | A | 30 | 12 | 4.43 | 70.5 | 283.8 | 29.8 |
| Example 42 | 22 | A | 30 | 12 | 4.43 | 72.0 | 272.1 | 28.6 |

TABLE 7-continued

| | Drying properties | | Fixing properties | | 60° glossiness | | Glossy offset | Air permeability (sec) | |
|---|---|---|---|---|---|---|---|---|---|
| | After 5 sec of printing | After 10 sec of printing | After 5 minutes of printing | Printing density | Printed matter | White paper | printing texture | White paper | Discharging properties |
| Example 21 | 0.11 | 0.08 | 0.14 | 1.99 | 63 | 33 | Good | 7500 | Good |
| Example 22 | 0.11 | 0.08 | 0.36 | 1.91 | 52 | 33 | Good | 7500 | Good |
| Example 23 | 0.07 | 0.05 | 0.15 | 2.06 | 58 | 33 | Good | 7500 | Good |
| Example 24 | 0.07 | 0.06 | 0.14 | 2.01 | 56 | 33 | Good | 7500 | Good |
| Example 25 | 0.07 | 0.07 | 0.16 | 2.05 | 59 | 33 | Good | 7500 | Good |
| Example 26 | 0.10 | 0.08 | 0.17 | 2.07 | 60 | 33 | Good | 7500 | Good |
| Example 27 | 0.13 | 0.10 | 0.18 | 2.03 | 57 | 33 | Good | 7500 | Good |
| Example 28 | 0.15 | 0.12 | 0.19 | 2.06 | 62 | 35 | Good | 10000 | Good |
| Example 29 | 0.13 | 0.09 | 0.21 | 2.12 | 61 | 34 | Good | 9500 | Good |
| Example 30 | 0.12 | 0.09 | 0.18 | 2.10 | 58 | 33 | Good | 8500 | Good |
| Example 31 | 0.08 | 0.07 | 0.14 | 1.97 | 55 | 32 | Good | 7000 | Good |
| Example 32 | 0.08 | 0.06 | 0.13 | 1.89 | 52 | 31 | Not bad | 7000 | Good |
| Example 33 | 0.13 | 0.08 | 0.21 | 1.99 | 63 | 35 | Good | 9500 | Good |
| Example 34 | 0.14 | 0.08 | 0.23 | 1.98 | 59 | 32 | Not bad | 7500 | Good |
| Example 35 | 0.06 | 0.05 | 0.13 | 1.79 | 57 | 31 | Not bad | 5500 | Good |
| Example 36 | 0.13 | 0.10 | 0.24 | 2.14 | 65 | 37 | Not bad | 10000 | Good |
| Example 37 | 0..07 | 0.05 | 0.20 | 2.02 | 59 | 33 | Good | 7500 | Good |
| Example 38 | 0.06 | 0.05 | 0.23 | 2.01 | 57 | 33 | Good | 7500 | Good |
| Example 39 | 0.06 | 0.05 | 0.25 | 2.00 | 58 | 33 | Good | 7500 | Good |
| Example 40 | 0.03 | 0.03 | 0.14 | 2.28 | 63 | 33 | Good | 7500 | Good |
| Example 41 | 0.05 | 0.04 | 0.13 | 1.90 | 56 | 33 | Good | 7500 | Good |
| Example 42 | 0.05 | 0.05 | 0.12 | 2.23 | 57 | 33 | Good | 7500 | Good |

TABLE 8

| | Inkjet ink No. | Inkjet recording medium Preparation exampl | Ink discharging conditions | | Content of water-soluble organic solvent A in one dot ($\times 10^{-21}$ g) | Average dot diameter ($\times 10^{-6}$ m) | Y ($\times 10^{-15}$ g/m$^2$) | Y/X ($\times 10^{-15}$) |
|---|---|---|---|---|---|---|---|---|
| | | | Frequency (kHz) | Liquid drop size (pI) | | | | |
| Comp-Ex 1 | 23 | A | 30 | 12 | 0.02 | 73.0 | 1.1 | 0.1 |
| Comp-Ex 2 | 24 | A | 30 | 12 | 2.54 | 72.5 | 153.8 | 16.2 |
| Comp-Ex 3 | 25 | A | 30 | 12 | 1.32 | 82.0 | 62.7 | 6.6 |
| Comp-Ex 4 | 26 | A | 30 | 12 | 0.02 | 71.5 | 1.2 | 0.1 |
| Comp-Ex 5 | 26 | A | 30 | 7 | 0.01 | 64.0 | 0.9 | 0.1 |
| Comp-Ex 6 | 26 | A | 30 | 5 | 0.01 | 56.5 | 0.8 | 0.1 |
| Comp-Ex 7 | 26 | A | 20 | 12 | 0.02 | 71.0 | 1.2 | 0.1 |
| Comp-Ex 8 | 26 | A | 40 | 12 | 0.02 | 70.5 | 1.2 | 0.1 |
| Comp-Ex 9 | 27 | A | 30 | 12 | 3.80 | 70.0 | 246.9 | 26.0 |
| Comp-Ex 10 | 28 | A | 30 | 12 | 6.07 | 73.5 | 357.7 | 37.6 |
| Comp-Ex 11 | 1 | K | 30 | 12 | 4.43 | 71.5 | 275.9 | 41.0 |
| Comp-Ex 12 | 1 | L | 30 | 12 | 4.43 | 69.0 | 296.3 | 29.4 |
| Comp-Ex 13 | 1 | M | 30 | 12 | 4.43 | 68.5 | 300.6 | 28.5 |
| Comp-Ex 14 | 1 | N | 30 | 12 | 4.43 | 70.0 | 287.9 | 30.1 |
| Comp-Ex 15 | 1 | O | 30 | 12 | 4.43 | 54.5 | 474.9 | 47.8 |
| Comp-Ex 16 | 1 | P | 30 | 12 | 4.43 | 71.5 | 275.9 | 29.0 |
| Comp-Ex 17 | 1 | Q | 30 | 12 | 4.43 | 70.5 | 283.8 | 29.8 |
| Comp-Ex 18 | 1 | R | 30 | 12 | 4.43 | 71.0 | 279.8 | 29.4 |
| Comp-Ex 19 | 1 | S | 30 | 12 | 4.43 | 71.5 | 275.9 | 18.8 |

| | Drying properties | | Fixing properties | | 60° glossiness | | Glossy offset | Air permeability (sec) | |
|---|---|---|---|---|---|---|---|---|---|
| | After 5 sec of printing | After 10 sec of printing | After 5 minutes of printing | Printing density | Printed matter | White paper | printing texture | White paper | Discharging properties |
| Comp-Ex 1 | 0.35 | 0.18 | 0.20 | 2.02 | 55 | 33 | Good | 7500 | Good |
| Comp-Ex 2 | 0.33 | 0.17 | 0.25 | 2.03 | 56 | 33 | Good | 7500 | Good |
| Comp-Ex 3 | 0.04 | 0.03 | 0.42 | 1.84 | 53 | 33 | Good | 7500 | Bad |
| Comp-Ex 4 | 0.36 | 0.21 | 0.38 | 2.01 | 57 | 33 | Good | 7500 | Good |
| Comp-Ex 5 | 0.34 | 0.20 | 0.37 | 1.88 | 52 | 33 | Good | 7500 | Good |
| Comp-Ex 6 | 0.36 | 0.19 | 0.37 | 1.65 | 49 | 33 | Good | 7500 | Good |
| Comp-Ex 7 | 0.35 | 0.20 | 0.38 | 2.00 | 56 | 33 | Good | 7500 | Good |

TABLE 8-continued

| | | | | | | | | | |
|---|---|---|---|---|---|---|---|---|---|
| Comp-Ex 8  | 0.35 | 0.21 | 0.39 | 2.02 | 57 | 33 | Good    | 7500  | Good |
| Comp-Ex 9  | 0.45 | 0.29 | 0.56 | 1.82 | 47 | 33 | Good    | 7500  | Bad  |
| Comp-Ex 10 | 0.08 | 0.06 | 0.41 | 1.89 | 58 | 33 | Good    | 7500  | Good |
| Comp-Ex 11 | 0.37 | 0.18 | 0.25 | 2.05 | 67 | 37 | Good    | 13000 | Good |
| Comp-Ex 12 | 0.07 | 0.04 | 0.16 | 1.67 | 55 | 24 | Not Bad | 4500  | Good |
| Comp-Ex 13 | 0.06 | 0.04 | 0.14 | 1.64 | 47 | 18 | Not Bad | 4000  | Good |
| Comp-Ex 14 | 0.09 | 0.07 | 0.41 | 1.83 | 56 | 32 | Good    | 8500  | Good |
| Comp-Ex 15 | 0.07 | 0.05 | 0.45 | 1.89 | 53 | 31 | Not Bad | 3000  | Good |
| Comp-Ex 16 | 0.68 | 0.39 | 0.39 | 1.91 | 58 | 33 | Good    | 16000 | Good |
| Comp-Ex 17 | 0.06 | 0.05 | 0.25 | 1.96 | 24 | 15 | Bad     | 8500  | Good |
| Comp-Ex 18 | 0.58 | 0.35 | 0.42 | 2.04 | 69 | 40 | Good    | 13000 | Good |
| Comp-Ex 19 | 0.47 | 0.33 | 0.41 | 2.05 | 63 | 35 | Good    | 12000 | Good |

As apparent from Table 6 to Table 8, in each Example where the ink receiving layer of the inkjet recording medium contains predetermined amounts of inorganic pigment, starch, copolymer latex and calcium carbonate, and the inkjet ink contains predetermined pigment, predetermined amount of the water-soluble organic solvents A and B and water, the ink discharging properties, the ink drying properties, the fixing properties, the printing density, and the glossiness were excellent, and the offset printing type texture was provided.

On the other hand, in Comparative Examples 1, 4 to 8 where the inkjet ink 23, 26, in which content of the water-soluble organic solvent A was less than 10% by weight, was used, the ink-drying properties were decreased. In Comparative Example 10 where inkjet ink 28, in which the content of the water-soluble organic solvent A exceeds 46% by weight, was used, the ink fixing properties were decreased.

In Comparative Example 2 where the inkjet ink 24, in which content of the water-soluble organic solvent B exceeds 5% by weight, was used, the ink-drying properties were decreased.

In Comparative Example 3 where the inkjet ink 25, in which content of water exceeds 70% by weight, was used, the ink fixing properties were decreased. Also, as the ink-drying properties were too high, ink was solidified on the surface of the head nozzle, and the discharging properties were decreased.

In Comparative Example 9 where the pigment dispersed with water soluble polymer was used, ink stability was originally low, many aggregates were produced when the ink was dried on the surface of the head nozzle, and the drying properties and the fixing properties were decreased.

In Comparative Example 16 where calcium carbonate in the inorganic pigment of the ink receiving layer was not engineered calcium carbonate, there were many fine particles and the fine particles were caught and filled in the gaps of the ink receiving layer. Accordingly, the ink drying properties were decreased. In Comparative Example 11 where the amount of the engineered calcium carbonate was less than 50 weight and the amount of kaolin was 50 weight % or more, the ink drying properties were decreased.

On the other hand, in Comparative Example 12 where the amount of calcium carbonate was 80 weight % or more and in Comparative Example 13 where the amount of calcium carbonate was 80 weight % or more and the amount of kaolin was less than 10 weight %, good printing density could not be provided.

In Comparative Example 14 where no starch was added to the coating color for the ink receiving layer, the water retention properties of the coating color for the ink receiving layer is insufficient, the coating unevenness of the ink receiving layer was great, and the ink fixing properties were poor in the part where the ink receiving layer was less coated.

In Comparative Example 15 where no copolymer latex was added to the coating color for the ink receiving layer, ink was not sufficiently spread upon the inkjet recording and the ink fixing properties were poor in the part where the ink was excess.

In Comparative Example 17 where the amount of the organic pigment was less than 1 weight parts with respect to 100 parts by weight of the inorganic pigment of the ink receiving layer, the glossiness was decreased to less than 25% and a glossy offset printing type texture was poor.

On the other hand, in Comparative Example 18 where the amount of the organic pigment exceeded 10 weight parts with respect to 100 parts by weight of the inorganic pigment, the organic pigment was caught and filled in the gaps of the ink receiving layer. Accordingly, the ink drying properties and fixing properties were decreased. In Comparative Example 19 where the Tg of the organic pigment was less than 20° C., when the coating color for the ink receiving layer was coated and dried to form the ink receiving layer, the organic pigment was soften and melted and the gaps of the ink receiving layer were easily filled therewith. Accordingly, the ink drying properties and the fixing properties were decreased.

We claim:

1. An inkjet recording medium having an ink receiving layer containing an inorganic pigment, starch, and copolymer latex on at least one surface of a base, characterized in that
the inorganic pigment contains engineered calcium carbonate and kaolin, an amount of the engineered calcium carbonate is from 50% by weight or more to less than 80% by weight and an amount of the kaolin is from 10% by weight or more to less than 50% by weight with respect to a total amount of the inorganic pigment,
wherein the engineered calcium carbonate has a ratio (D75/D25) of a cumulative 75% by weight particle diameter (D75 (μm)) and a cumulative 25% by weight particle diameter (D25 (μm)) measured by an X-ray transmission sedimentation particle size distribution measurement method of 3.0 or less, and
the ink receiving layer further contains from 1 part by weight or more to 10 parts by weight or less of an organic pigment having a glass transition temperature (Tg) of 20° C. or more with respect to 100 parts by weight of the inorganic pigment.

2. The inkjet recording medium according to claim 1, wherein the engineered calcium carbonate has a volume 50% average particle diameter (D50) measured by a laser light scattering method of 0.2 μm or more to 2.0 μm or less.

3. The inkjet recording medium according to claim 1, wherein the kaolin has a volume 50% average particle diameter (D50) measured by a laser light scattering method of 0.1 µm or more to 1.5 µm or less.

4. The inkjet recording medium according to claim 1, wherein the amount of the kaolin is from 20% by weight or more to 40% by weight or less with respect to a total amount of the inorganic pigment.

5. The inkjet recording medium according to claim 1, wherein the copolymer latex contains an acrylonitrile styrene butadiene-based copolymer.

6. The inkjet recording medium according to claim 1, wherein white paper glossiness at a light incidence angle of 60 degrees according to JIS Z8741 of a surface of the ink receiving layer is from 25% or more to 50% or less.

7. The inkjet recording medium according to claim 1, wherein the inkjet recording medium has air permeability according to J. TAPPI No. 5-2: 2000 of from 5000 seconds or more to less than 11000 seconds.

8. An inkjet recording method for printing an inkjet recording medium with inkjet ink as aqueous pigment ink, wherein
the inkjet recording medium includes an ink receiving layer containing an inorganic pigment, starch, and a copolymer latex on at least one surface of a base,
the inorganic pigment of the ink receiving layer contains engineered calcium carbonate and kaolin, an amount of the engineered calcium carbonate is from 50% by weight or more to less than 80% by weight, and an amount of the kaolin is from 10% by weight or more to less than 50% by weight with respect to the total amount of the inorganic pigment,
wherein the engineered calcium carbonate has a ratio (D75/D25) of a cumulative 75% by weight particle diameter (D75 (µm)) and a cumulative 25% by weight particle diameter (D25 (µm)) measured by an X-ray transmission sedimentation particle size distribution measurement method of 3.0 or less, and
the ink receiving layer further contains from 1 part by weight or more to 10 parts by weight or less of an organic pigment having a glass transition temperature (Tg) of 20° C. or more with respect to 100 parts by weight of the inorganic pigment, and
the inkjet ink contains one or more pigments selected from self-dispersed pigment and pigment containing water insoluble polymer particles, from 10% by weight or more to 46% by weight or less of a water soluble organic solvent A having a boiling point of 230° C. or less, from 0% by weight or more to 5.0% by weight or less of a water soluble organic solvent B having a boiling point of 280° C. or more, and from 44% by weight or more to 70% by weight or less of water.

9. The inkjet recording method according to claim 8, wherein the printing is performed by one pass printing at a frequency of 20 kHz or more.

10. The inkjet recording method according to claim 8, wherein a ratio Y/X satisfies the following formula:

$$12 \times 10^{-15} \leq Y/X \leq 11 \times 10^{-14}$$

where X is an amount (g/m$^2$) of the engineered calcium carbonate per unit area of the ink receiving layer and Y is an amount of the water soluble organic solvent A (g/m$^2$) per dot area when the inkjet recording medium is dot printed with the inkjet ink.

11. The inkjet recording method according to claim 8, wherein the inkjet ink further contains from 0.6% by weight or more to 3.0% by weight or less of a nonionic surfactant.

12. The inkjet recording method according to claim 8, wherein the pigment of the inkjet ink contains water insoluble polymer particles.

13. The inkjet recording method according to claim 8, wherein the engineered calcium carbonate has a volume 50% average particle diameter (D50) measured by a laser light scattering method of 0.2 µm or more to 2.0 µm or less.

14. The inkjet recording method according to claim 8, wherein the kaolin has a volume 50% average particle diameter (D50) measured by a laser light scattering method of 0.1 µm or more to 1.5 µm or less.

15. The inkjet recording method according to claim 8, wherein the copolymer latex contains an acrylonitrile styrene butadiene-based copolymer.

16. The inkjet recording medium according to claim 2, wherein the kaolin has a volume 50% average particle diameter (D50) measured by a laser light scattering method of 0.1 µm or more to 1.5 µm or less.

17. The inkjet recording medium according to claim 2, wherein the amount of the kaolin is from 20% by weight or more to 40% by weight or less with respect to a total amount of the inorganic pigment.

* * * * *